United States Patent
Sugita et al.

(10) Patent No.: US 7,790,326 B2
(45) Date of Patent: Sep. 7, 2010

(54) FUEL CELL AND SEPARATOR FOR FUEL CELL

(75) Inventors: Narutoshi Sugita, Utsunomiya (JP); Takashi Kosaka, Utsunomiya (JP); Shuji Sato, Utsunomiya (JP); Takeshi Muro, Utsunomiya (JP); Masaaki Sakano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1112 days.

(21) Appl. No.: 11/471,257

(22) Filed: Jun. 20, 2006

(65) Prior Publication Data

US 2007/0003816 A1   Jan. 4, 2007

(30) Foreign Application Priority Data

Jun. 22, 2005   (JP)  ............................. 2005-182074

(51) Int. Cl.
H01M 2/00   (2006.01)
H01M 2/02   (2006.01)
H01M 2/14   (2006.01)

(52) U.S. Cl. ................. 429/455; 429/434; 429/452; 429/456; 429/457; 429/460

(58) Field of Classification Search ................. 429/34, 429/38, 39
See application file for complete search history.

(56) References Cited

U.S. PATENT DOCUMENTS

| 5,260,143 | A | 11/1993 | Voss et al. |
| 6,040,072 | A * | 3/2000 | Murphy et al. ................. 429/12 |
| 6,066,409 | A | 5/2000 | Ronne et al. |
| 6,261,711 | B1 * | 7/2001 | Matlock et al. ................ 429/34 |
| 6,677,072 | B2 * | 1/2004 | Suenaga et al. ............... 429/35 |
| 6,866,959 | B2 | 3/2005 | Kikuchi et al. |
| 2005/0079400 | A1 | 4/2005 | Sugiura et al. |

FOREIGN PATENT DOCUMENTS

| JP | 2004-259649 | 9/2004 |
| JP | 2005-071955 | 3/2005 |

* cited by examiner

*Primary Examiner*—Patrick Ryan
*Assistant Examiner*—Julian Mercado
(74) *Attorney, Agent, or Firm*—Lahive & Cockfield, LLP; Anthony A. Laurentano, Esq.

(57) ABSTRACT

A unit cell of a fuel cell includes a membrane electrode assembly and an anode side metal separator and a cathode side metal separator sandwiching the membrane electrode assembly. A plurality of first supply holes and a plurality of second supply holes extend through a channel unit of the anode side metal separator, and the channel unit connects a fuel gas supply passage and a fuel gas flow field. A fuel gas from the fuel gas supply passage flows into the first supply holes, and flows through an inlet connection channel. The fuel gas flows into the second supply holes connected to an end of the inlet connection channel. The fuel gas flows toward the side of the membrane electrode assembly, and then, the fuel gas is supplied to an anode.

18 Claims, 21 Drawing Sheets

FUEL CELL AND SEPARATOR FOR FUEL CELL

BACKGROUND OF THE INVENTION

1. Field of the Invention

The present invention relates to a fuel cell comprising unit cells. Each of the unit cells includes an electrolyte electrode assembly and separators sandwiching the electrolyte electrode assembly. The electrolyte electrode assembly includes a pair of electrodes, and an electrolyte interposed between the electrodes. A reactant gas passage extends through the separators for allowing at least one of a fuel gas and an oxygen-containing gas as a reactant gas to flow through the reactant gas passage. Further, the present invention relates to the separator for the fuel cell.

2. Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a solid polymer ion exchange membrane. The membrane electrode assembly and separators sandwiching the membrane electrode assembly make up a unit of power generation cell (unit cell) for generating electricity. In use, generally, a predetermined number of unit cells are stacked together to form a fuel cell stack.

In the fuel cell, a fuel gas flow field (reactant gas flow field) and an oxygen-containing flow field (reactant gas flow field) are formed in surfaces of the separators. A fuel gas flows through the fuel gas flow field along the anode, and an oxygen-containing gas flows through the oxygen-containing gas flow field along the cathode. Further, a fuel gas supply passage and a fuel gas discharge passage (reactant gas passages) connected to the fuel gas flow field, and an oxygen-containing gas supply passage and an oxygen-containing gas discharge passage (reactant gas passages) connected to the oxygen-containing gas flow field extend through the separators in the stacking direction.

In the structure, the reactant gas flow field is connected to the reactant gas passage through a connection channel (reactant gas flow field formed in a bridge portion). For example, the connection channel includes parallel grooves for allowing the reactant gas to flow smoothly and uniformly. However, at the time of tightening the separators, the membrane electrode assemblies, and seal members between these components, the seal member may be deformed into the connection channel undesirably. Therefore, the desired sealing performance may not be maintained. Further, if the connection channel is closed, the reactant gas does not flow suitably.

U.S. Pat. No. 6,066,409 discloses an electrochemical fuel cell stack as shown in FIG. 21. The fuel cell stack includes anode separator plates 1a, 1b and cathode separator plates 2a, 2b and an MEA 3. An anode 3a of the MEA 3 contacts the anode separator plate 1a, and a cathode 3b of the MEA 3 contacts the cathode separator plate 2a.

The MEA 3 includes seals 4. A fuel gas manifold 5a and an oxygen-containing gas manifold 5b extend through the MEA 3 in the stacking direction of the stack. A fuel gas channel 6a is formed between the cathode separator plate 2b and the anode separator plate 1a, and the fuel gas manifold 5a is connected from the fuel gas channel 6a to a fuel gas flow field 8a through an opening 7a. Likewise, an oxygen-containing gas channel 6b is formed between the anode separator plate 1b and the cathode separator plate 2a, and the oxygen-containing gas manifold 5b is connected from the oxygen-containing gas channel 6b to an oxygen-containing gas flow field 8b through an opening 7b.

According to the disclosure, in the structure, the seals 4 do not face the opening of grooves connected to the fuel gas manifold 5a and the oxygen-containing gas manifold 5b, and no bridging members are required.

Normally, in the fuel cell stack, water for humidification is supplied, and water is generated in the power generation reaction. The water may be condensed in the fuel gas channel 6a or the oxygen-containing gas channel 6b. Thus, the fuel gas channel 6a and the oxygen-containing gas channel 6b are closed easily. Consequently, the fuel gas and the oxygen-containing gas are not supplied to the power generation area of the MEA 3, and the desired power generation cannot be performed suitably.

In order to ensure that the water is discharged from the fuel gas channel 6a and the oxygen-containing gas efficiently, it may be contemplated to increase the flow field resistance (pressure loss). If the length of grooves in the fuel gas channel 6a or the oxygen-containing gas channel 6b is large, the overall size of the fuel cell stack becomes large.

If the width or the flow field height of the fuel gas channel 6a or the oxygen-containing gas channel 6b is reduced, and the cross sectional area is reduced, the water cannot be discharged efficiently due to the surface tension of the water.

SUMMARY OF THE INVENTION

A main object of the present invention is to provide a fuel cell and a separator having simple and compact structure in which the water is discharged efficiently, and the desired power generation performance is achieved.

The present invention relates to a fuel cell comprising a unit cell. The unit cell includes an electrolyte electrode assembly and separators sandwiching the electrolyte electrode assembly. The electrolyte electrode assembly includes a pair of electrodes, and an electrolyte interposed between the electrodes. A reactant gas passage extends through the separators for allowing at least one of a fuel gas and an oxygen-containing gas as a reactant gas to flow through the reactant gas passage. A reactant gas flow field is formed in one of the separators for allowing the reactant gas to flow along one electrode surface of the electrolyte electrode assembly. Further, the present invention relates to the separator for the fuel cell.

The one of the separators has a channel unit connecting the reactant gas passage and the reactant gas flow field. The channel unit includes a first opening extending through the one of the separators at a position near the reactant gas passage for allowing the reactant gas to flow through the first opening, and a second opening extending through the one of the separators at a position near the reactant gas flow field for allowing the reactant gas to flow through the second opening.

Further, it is preferable that a channel connecting the reactant gas passage and the first opening from one electrode surface of the electrolyte electrode assembly, and a connection channel connecting the first opening and the second opening on a surface opposite to the one electrode surface are provided.

Further, it is preferable that a coolant flow field extending along a separator surface is formed for each of the unit cells or for every two or more unit cells.

Further, preferably, the connection channel is formed by a seal member. Further, preferably, a seal member for blocking an area between the first opening and the second opening is provided on the one electrode surface. Further, preferably, the channel is formed by a seal member.

Further, the electrolyte electrode assembly has the any of (i) the structure in which the electrolyte electrode assembly comprises a first electrode, a second electrode and an electrolyte membrane interposed between the first and second electrodes, and the surface area of the second electrode is larger than the surface area of the first electrode, (ii) the structure in which the electrolyte electrode assembly comprises a pair of electrodes, and an electrolyte membrane interposed between the pair of electrodes, and the surface area of one of the pair of electrodes, the surface area of the other of the pair of electrodes, and the surface area of the electrolyte membrane are the same, and (iii) the structure in which the electrolyte electrode assembly comprises a pair of electrodes, and an electrolyte membrane interposed between the pair of electrodes, and the surface area of the electrolyte membrane is large in comparison with the pair of electrodes.

Further, the present invention relates to a fuel cell formed by stacking a plurality of unit cells in a stacking direction, and separators sandwich an electrolyte electrode assembly in each of the unit cells. The electrolyte electrode assembly includes electrodes, and an electrolyte interposed between the electrodes. A reactant gas passage extends through the separators for allowing at least one of a fuel gas and an oxygen-containing gas as a reactant gas to flow through the reactant gas passage. A reactant gas flow field is formed in one of the separators for allowing the reactant gas to flow along one electrode surface of the electrolyte electrode assembly.

A coolant flow field extending along a separator surface is formed for every two or more unit cells, and a common channel connected to the reactant gas passage is formed between adjacent first and second separators.

The first separator has a first reactant gas flow field for allowing the reactant gas to flow along the one electrode surface of the electrolyte electrode assembly. A first opening extends through the first separator. The first opening is connected to the common channel for allowing the reactant gas to flow though the first opening. A second opening extends through the first separator at a position near the first reactant gas flow field for allowing the reactant gas to flow through the second opening. The second separator has a second reactant gas flow field for allowing the reactant gas to flow the one electrode surface of another electrolyte electrode assembly, and an opening extends through the second separator for connecting the common channel and the second reactant gas flow field.

Further, it is preferable that the common channel is formed by a seal member.

Further, in the separator of the present invention, it is preferable that a fuel gas flow field is formed on one surface of the separator for allowing a fuel gas as the reactant gas to flow along the one electrode surface of the electrolyte electrode assembly, and an oxygen-containing gas flow field is formed on the other surface of the separator for allowing an oxygen-containing gas as the other reactant gas along the other electrode surface of the electrolyte electrode assembly.

According to the present invention, the separator has the first and second openings. For example, the reactant gas flows from the reactant gas passage into the first opening, and then, the reactant gas is supplied from the second opening to the reactant gas flow field. In the structure, since the first and second openings are provided in the channel unit connecting the reactant gas passage and the reactant gas flow field, the flow field resistance (pressure loss) is increased effectively. Thus, the water is discharged from the channel unit efficiently.

Therefore, the reactant gas is supplied to the power generation area reliably, and the desired power generation performance is achieved. Further, the length of the channel unit is reduced, and the structure of the channel unit becomes simple and compact.

Further, in the present invention, the coolant flow field is provided for every two or more unit cells. Further, the common channel connected to the reactant gas passage is formed between the first and second separators. Therefore, the reactant gas flows separately from the common channel into the first opening of the first separator and the opening of the second separator. In the structure, the number of grooves in the flow field is reduced, and the flow field structure is simplified effectively.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
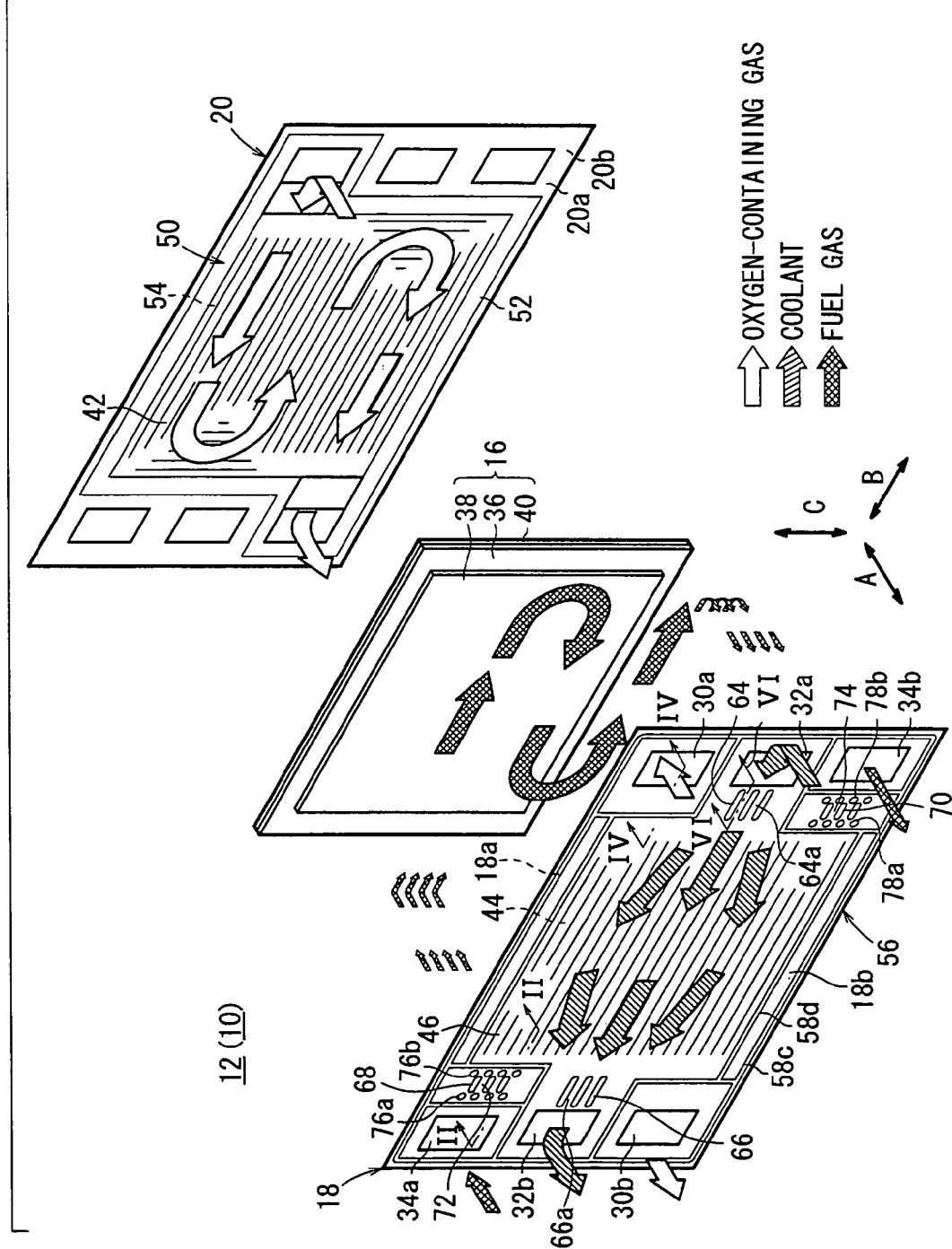
FIG. 1 is an exploded perspective view showing main components of a unit cell (power generation cell) of a fuel cell according to a first embodiment of the present invention.
Figure 2:
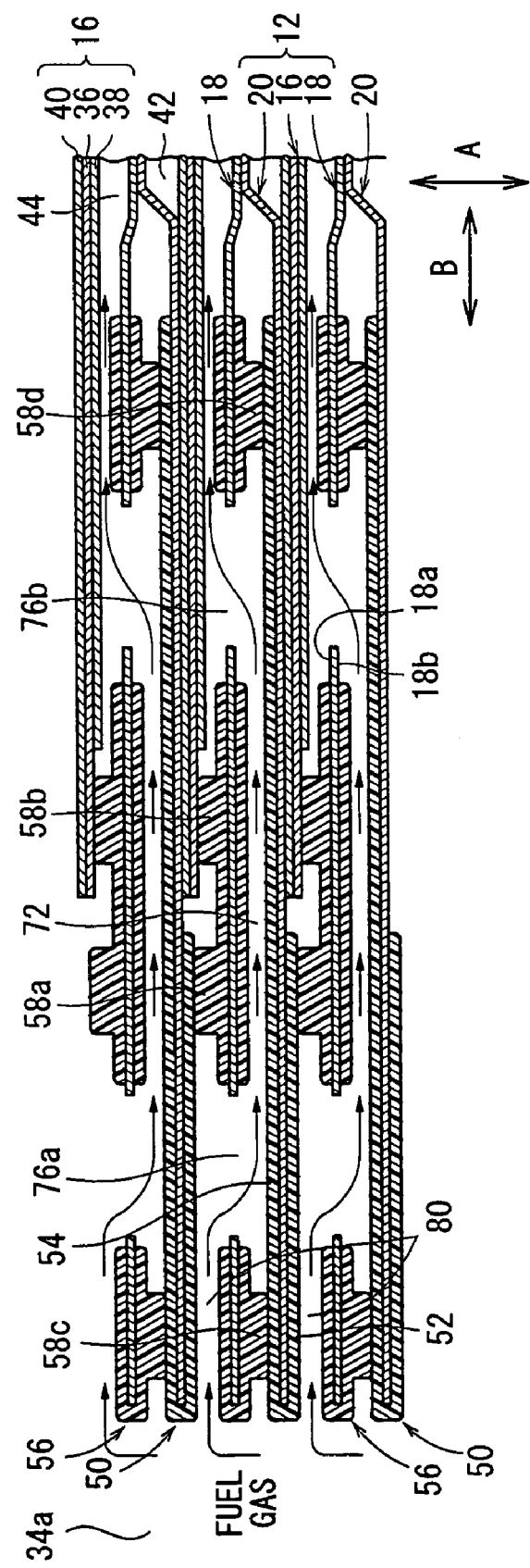
FIG. 2 is a cross sectional view showing the fuel cell, taken along a line II-II in FIG. 1.

FIG. 1 is an exploded perspective view showing main components of a unit cell 12 of a fuel cell 10 according to a first embodiment of the present invention. FIG. 2 is a cross sectional view showing the fuel cell 10 having stack structure formed by stacking a plurality of the unit cells 12 in a direction indicated by an arrow A, taken along a line II-II in FIG. 1.

As shown in FIG. 2, the fuel cell 10 has stack structure formed by stacking a plurality of the unit cells 12 in the direction indicated by the arrow A. The unit cell 12 includes a membrane electrode assembly (electrolyte electrode assembly) 16, and an anode side metal separator (one separator) 18 and a cathode side metal separator (the other separator) 20 sandwiching the membrane electrode assembly 16. For example, the anode side metal separator 18 and the cathode side metal separator 20 are steel plates, stainless steel plates, aluminum plates, plated steel sheets, or metal plates having surfaces subjected to anti-corrosive surface treatment.

At one end of the unit cell 12 in a horizontal direction indicated by an arrow B in FIG. 1, an oxygen-containing gas discharge passage (reactant gas passage) 30b for discharging an oxygen-containing gas (reactant gas), a coolant discharge passage 32b for discharging a coolant, and a fuel gas supply passage (reactant gas passage) 34a for supplying a fuel gas (reactant gas) such as a hydrogen containing gas are arranged vertically in a direction indicated by an arrow C. The oxygen-containing gas discharge passage 30b, the coolant discharge passage 32b, and the fuel gas supply passage 34a extend through the unit cell 12 in the stacking direction indicated by the arrow A.

At the other end of the unit cell 12 in the direction indicated by the arrow B, a fuel gas discharge passage (reactant gas passage) 34b for discharging the fuel gas, a coolant supply passage 32a for supplying the coolant, and an oxygen-containing gas supply passage (reactant gas passage) 30a for supplying the oxygen-containing gas are arranged in the direction indicated by the arrow C. The fuel gas discharge passage 34b, the coolant supply passage 32a, and the oxygen-containing gas supply passage 30a extend through the unit cell 12 in the direction indicated by the arrow A.

The membrane electrode assembly 16 includes an anode (one electrode) 38, a cathode (the other electrode) 40, and a solid polymer electrolyte membrane (electrolyte) 36 interposed between the anode 38 and the cathode 40. The solid polymer electrolyte membrane 36 is formed by impregnating a thin membrane of perfluorosulfonic acid with water, for example. The surface area of the anode 38 is smaller than the surface area of the cathode 40.

Each of the anode 38 and the cathode 40 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 38 and the electrode catalyst layer of the cathode 40 are formed on both surfaces of the solid polymer electrolyte membrane 36, respectively.

Figure 3:
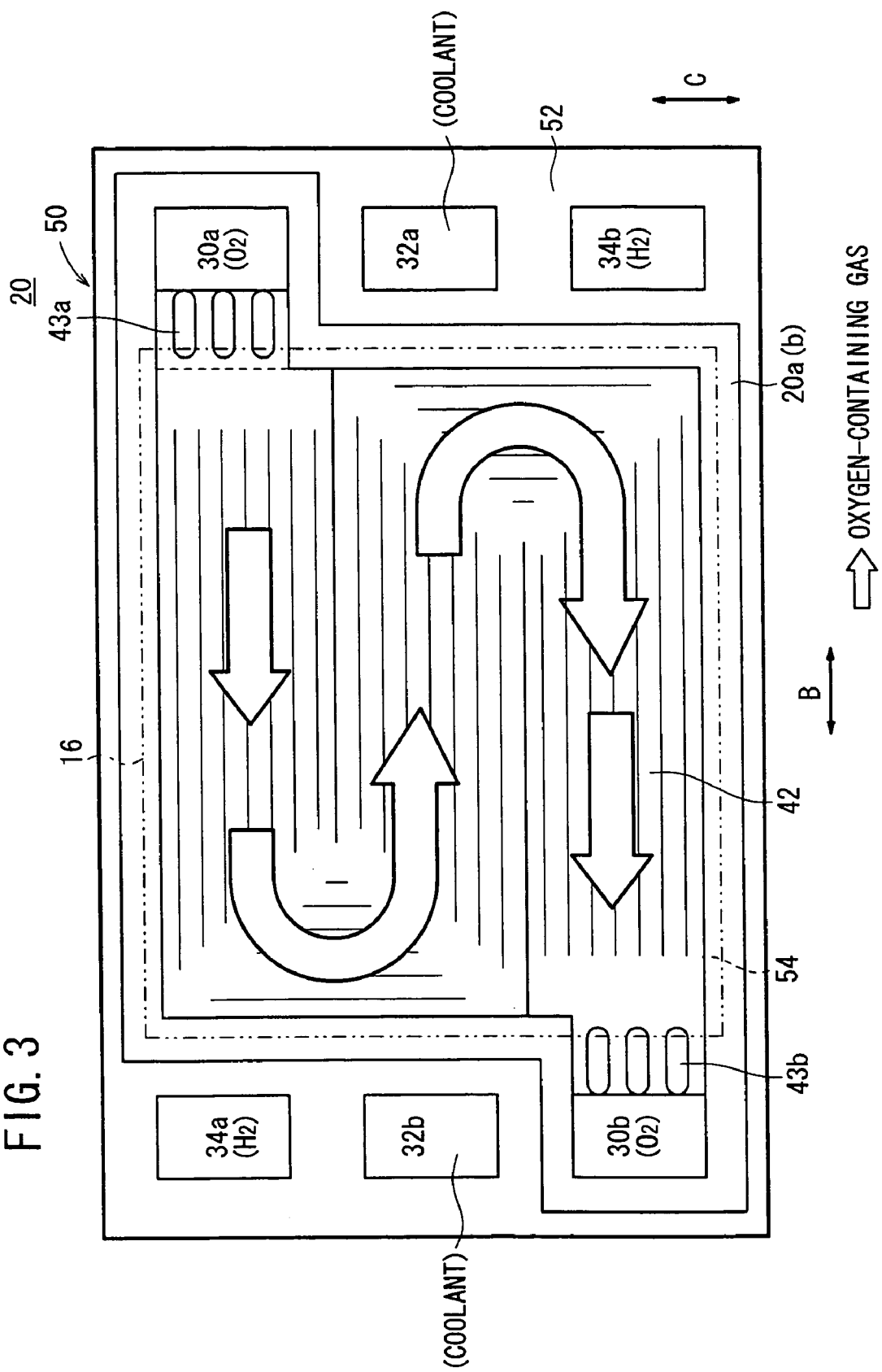
FIG. 3 is a front view showing a cathode side metal separator of the fuel cell.
Figure 4:
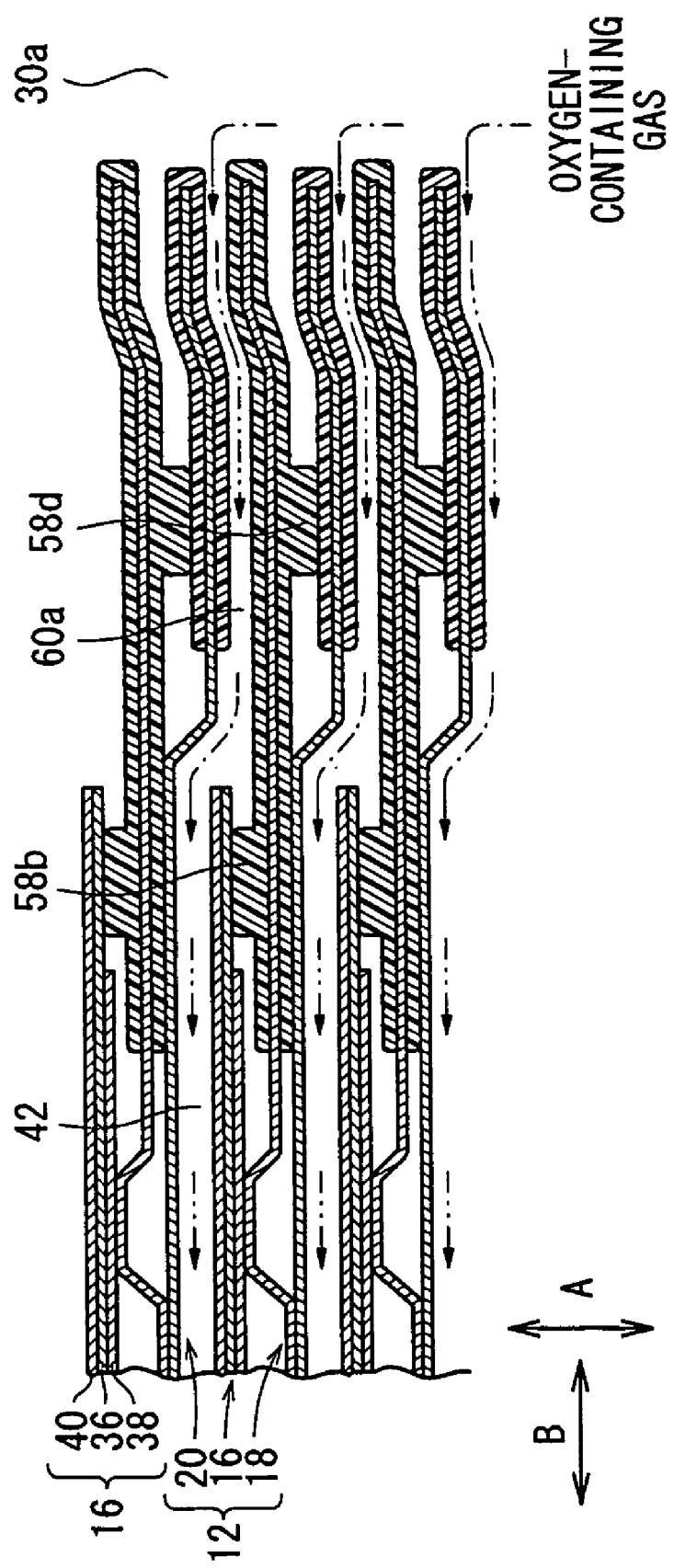
FIG. 4 is a cross sectional view showing the fuel cell, taken along a line IV-IV in FIG. 1.

As shown in FIGS. 1, 3, and 4, the cathode side metal separator 20 has an oxygen-containing gas flow field (reactant gas flow field) 42 on its surface 20a facing the membrane electrode assembly 16. For example, the oxygen-containing gas flow field 42 has a serpentine pattern for allowing the oxygen-containing gas to flow back and forth in the direction indicated by the arrow B, and move downwardly. The oxygen-containing gas flow field 42 is connected to the oxygen-containing gas supply passage 30a and the oxygen-containing gas discharge passage 30b. Bridges 43a, 43b are provided near the oxygen-containing gas supply passage 30a and the oxygen-containing gas discharge passage 30b to cover the inlet and the outlet of the oxygen-containing gas flow field 42 (see FIG. 3).

Figure 5:
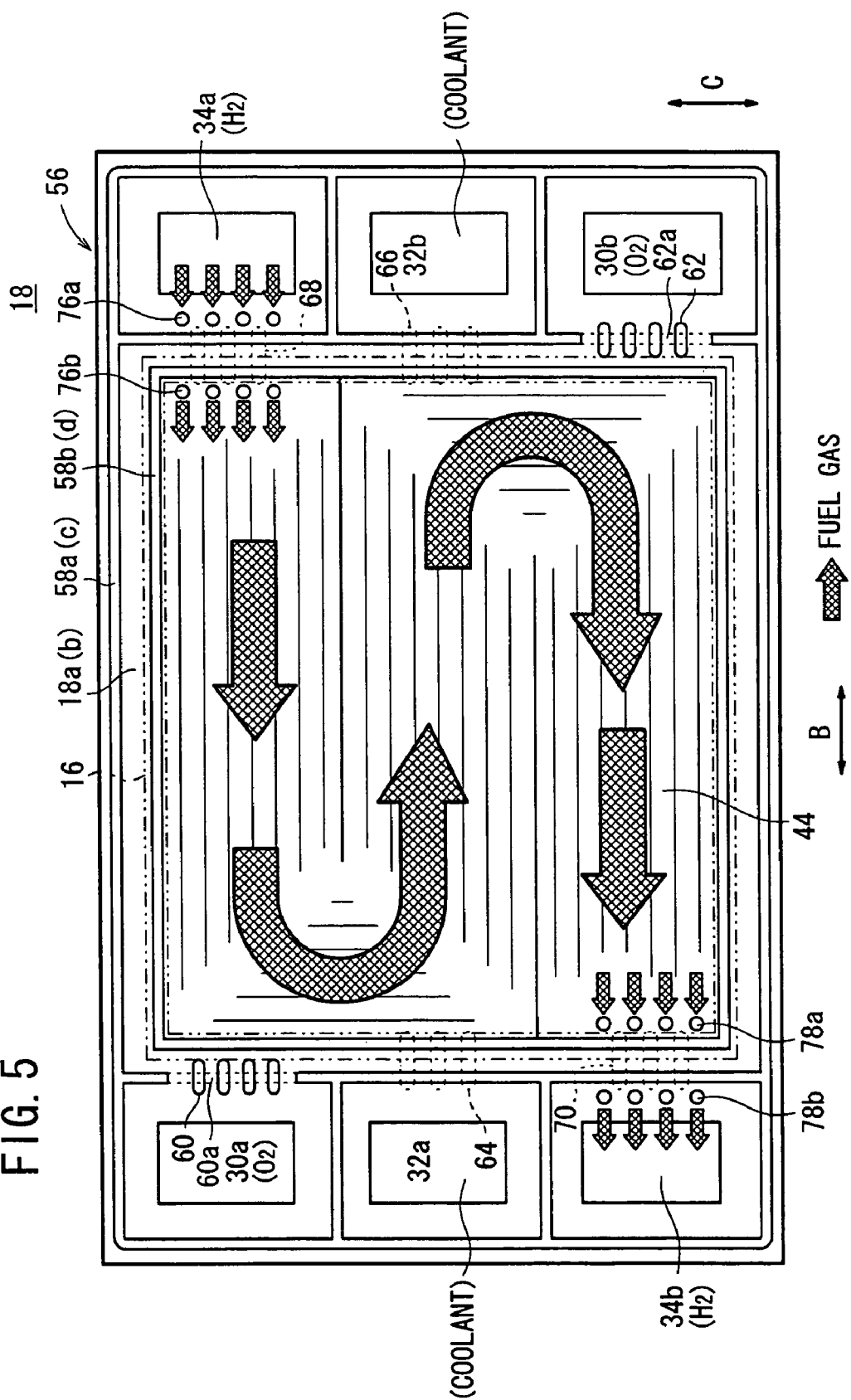
FIG. 5 is a front view showing an anode side metal separator of the fuel cell.

As shown in FIG. 5, the anode side metal separator 18 has a fuel gas flow field (reactant gas flow field) 44 as described later on its surface 18a facing the membrane electrode assembly 16. The fuel gas flow field 44 has a serpentine pattern for allowing the fuel gas to flow back and forth in the direction indicated by the arrow B, and move downwardly in the direction indicated by the arrow C. The fuel gas flow field 44 is connected to the fuel gas supply passage 34a and the fuel gas discharge passage 34b.

Figure 6:
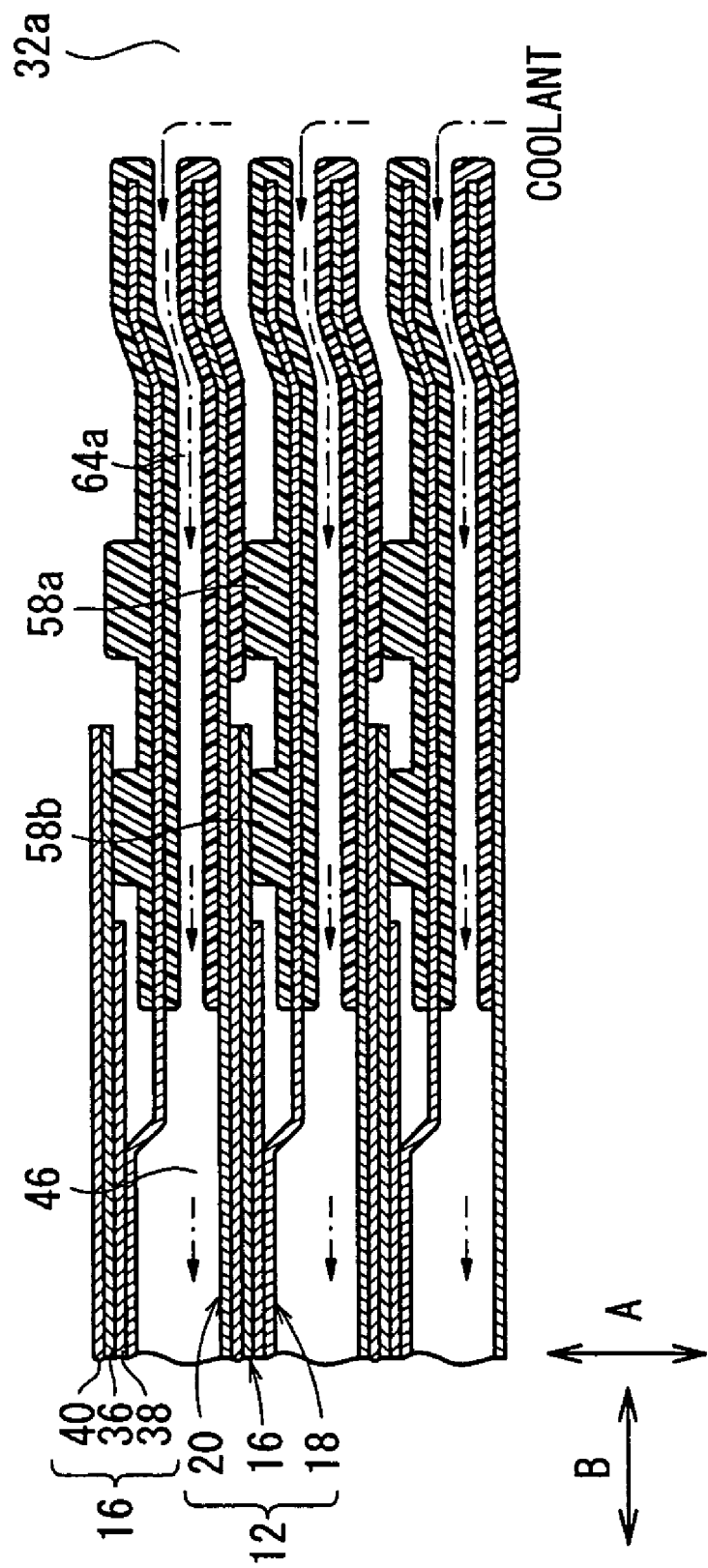
FIG. 6 is a cross sectional view showing the fuel cell, taken along a line VI-VI in FIG. 1.

As shown in FIGS. 1 and 6, a coolant flow field 46 is formed between a surface 18b of the anode side metal separator 18 and a surface 20b of the cathode side metal separator 20. The coolant flow field 46 is connected to the coolant supply passage 32a and the coolant discharge passage 32b. The coolant flow field 46 includes straight grooves extending along the separator surfaces in the direction indicated by the arrow B. The coolant flow field 46 is provided for each of the unit cells 12, or for every two or more unit cells 12.

As shown in FIGS. 1 and 3, a first seal member 50 is formed integrally on the surfaces 20a, 20b of the cathode side metal separator 20, around an outer end of the cathode side metal separator 20.

As shown in FIGS. 2 and 3, the first seal member 50 includes a first planar portion 52 formed integrally on the surface 20a of the cathode side metal separator 20, and a second planar portion 54 formed integrally on the surface 20b of the cathode side metal separator 20. The second planar portion 54 is wider than the first planar portion 52.

As shown in FIG. 2, the first planar portion 52 is formed around the membrane electrode assembly 16, and spaced outwardly from the outer end of the membrane electrode assembly 16. The second planar portion 54 is formed around the membrane electrode assembly 16 such that the second planar portion 54 is overlapped with a predetermined area of the outer region of the cathode 40 in the stacking direction. As shown in FIG. 3, the first planar portion 52 is formed such that the oxygen-containing gas supply passage 30a and the oxygen-containing gas discharge passage 30b are connected to the oxygen-containing gas flow field 42, and the second planar portion 54 is formed such that the coolant supply passage 32a and the coolant discharge passage 32b are connected to the coolant flow field 46.

As shown in FIGS. 1, 2, and 5, a second seal member 56 is formed integrally on surfaces 18a, 18b of the anode side metal separator 18, around the outer end of the anode side metal separator 18. The second seal member 56 includes an outer seal 58a provided on the surface 18a near the outer end of the anode side metal separator 18. Further, the second seal member 56 includes an inner seal 58b spaced inwardly from the outer seal 58a by a predetermined distance.

Various shapes such as a tapered end shape, a trapezoidal shape, and a semi-cylindrical shaped can be adopted as the cross sectional shapes of outer seal 58a and the inner seal 58b. As shown in FIG. 2, the outer seal 58a contacts the first planar portion 52 provided on the cathode side metal separator 20, and the inner seal 58b directly contacts the solid polymer electrolyte membrane 36 of the membrane electrode assembly 16.

As shown in FIG. 5, the outer seal 58a is formed around the oxygen-containing gas supply passage 30a, the coolant supply passage 32a, the fuel gas discharge passage 34b, the fuel gas supply passage 34a, the coolant discharge passage 32b, and the oxygen-containing gas discharge passage 30b. The inner seal 58b is formed around the fuel gas flow field 44. The outer end of the membrane electrode assembly 16 is positioned between the inner seal 58b and the outer seal 58a.

An outer seal 58c corresponding to the outer seal 58a and an inner seal 58d corresponding to the inner seal 58b are provided on the surface 18b of the anode side metal separator 18 (see FIG. 1). The shapes of the outer seal 58c and the inner seal 58d are similar to the shapes of the outer seal 58a and the inner seal 58b.

As shown in FIG. 5, the outer seal 58a includes a plurality of receivers 60 connecting the oxygen-containing gas supply passage 30a and the oxygen-containing gas flow field 42, and a plurality of receivers 62 connecting the oxygen-containing gas discharge passage 30b and the oxygen-containing gas flow field 42. The receivers 60 form a connection channel 60a, and the receivers 62 form a connection channel 62a.

As shown in FIGS. 1 and 5, a plurality of receivers 64 connecting the coolant supply passage 32a and the coolant flow field 46 and a plurality of receivers 66 connecting the coolant discharge passage 32b and the coolant flow field 46 are provided on the surface 18b of the anode side metal separator 18. The receivers 64 form a connection channel 64a and the receivers 66 form a connection channel 66a. Further, a plurality of receivers 68 are provided near the fuel gas supply passage 34a, and a plurality of receivers 70 are provided near the fuel gas discharge passage 34b on the surface 18b of the anode side metal separator 18. The receivers 68 form an inlet connection channel 72, and the receivers 70 form an outlet connection channel 74.

The fuel gas supply passage 34a is surrounded by the outer seal 58a on the surface 18a of the anode side metal separator 18. The receivers 68 are surrounded by the outer seal 58c and the inner seal 58d on the surface 18b of the anode side metal separator 18. A plurality of first supply holes (first openings) 76a extend through a portion between the receivers 68 and the fuel gas supply passage 34a, where an area surrounded by the outer seal 58a and an area surrounded by the outer seal 58c and the inner seal 58d are overlapped with each other.

A plurality of second supply holes (second openings) 76b extend through a portion between the receivers 68 and the fuel gas flow field 44, where an area surrounded by the inner seal 58b and an area surrounded by the outer seal 58c and the inner seal 58d are overlapped with each other.

That is, the first supply holes 76a and the second supply holes 76b form a channel unit connecting the fuel gas supply passage 34a and the fuel gas flow field 44. The channel unit may include three or more supply holes (not shown).

A plurality of first discharge holes (second openings) 78a and a plurality of second discharge holes (first openings) 78b are provided near the receivers 70. The first discharge holes 78a are positioned near the end of the fuel gas flow field 44, and the second discharge holes 78b are positioned near the fuel gas discharge passage 34b.

The first discharge holes 78a are provided in a portion where an area surrounded by the inner seal 58b on the surface 18a and an area surrounded by the outer seal 58c and the inner seal 58d on the surface 18b are overlapped with each other. The second discharge holes 78b are provided in a portion where an area surrounded by the outer seal 58a around the fuel gas discharge passage 34b on the surface 18a and an area surrounded by the outer seal 58c and the inner seal 58d on the surface 18b are overlapped with each other.

As shown in FIG. 2, the first and second seal members 50, 56 form a channel 80 extending from the first gas supply passage 34a to the first supply holes 76a. Further, the first and second seal members 50, 56 form the inlet connection channel 72. The first and second seal members 50, 56 block an area between the first and second supply holes 76a, 76b opposite to the inlet connection channel 72.

Next, operation of the fuel cell 10 will be described.

Firstly, as shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, an ethylene glycol and oil is supplied to the coolant supply passages 32a.

Thus, the oxygen-containing gas flows from the oxygen-containing gas supply passage 30a into the oxygen-containing gas flow field 42 of the cathode side metal separator 20 through the connection channel 60a (see FIG. 4). The oxygen-containing gas flows in the direction indicated by the arrow B in a serpentine pattern along the oxygen-containing gas flow field 42, and moves downwardly for inducing an electrochemical reaction at the cathode 40 of the membrane electrode assembly 16 (see FIGS. 1 and 3).

As shown in FIG. 2, the fuel gas flows from the fuel gas supply passage 34a to the surface 18a facing the anode 38. Then, the fuel gas flows into the first supply holes 76a, and is temporarily supplied to the surface 18b. On the surface 18b, the inlet connection channel 72 is formed by the receivers 68. The fuel gas flows through the inlet connection channel 72, and flows into the second supply holes 76b toward the surface 18a. The fuel gas is supplied to the fuel gas flow field 44. Then, as shown in FIG. 5, the fuel gas flows in the direction indicated by the arrow B in a serpentine pattern along the fuel gas flow field 44, and moves downwardly for inducing an electrochemical reaction at the anode 38 of the membrane electrode assembly 16.

Thus, in each of the membrane electrode assemblies 16, the oxygen-containing gas supplied to the cathode 40, and the fuel gas supplied to the anode 38 are consumed in the electrochemical reactions at catalyst layers of the cathode 40 and the anode 38 for generating electricity.

The oxygen-containing gas consumed at the cathode 40 is discharged into the oxygen-containing gas discharge passage 30b, and flows in the direction indicated by the arrow A. Likewise, the fuel gas consumed at the anode 38 flows into the first discharge holes 78a, and flows through the outlet connection channel 74. Then, the fuel gas flows into the second discharge holes 78b. The fuel gas is discharged into the fuel gas discharge passage 34b, and flows in the direction indicated by the arrow A.

Further, as shown in FIG. 6, the coolant supplied to the coolant supply passage 32a flows through the connection channel 64a into the coolant flow field 46 formed between the anode side metal separator 18 and the cathode side metal separator 20. The coolant flows through the coolant flow field 46 in the direction indicated by the arrow B. After the coolant cools the membrane electrode assembly 16, the coolant is discharged into the coolant discharge passage 32b through the connection channel 66a (see FIG. 1).

In the first embodiment, the anode side metal separator 18 has at least the first and second supply holes 76a, 76b between the fuel gas supply passage 34a and the inlet of the fuel gas flow field 44. The fuel gas from the fuel gas supply passage 34a flows through the channel 80 formed on the surface 18a of the anode side metal separator 18 into the first supply holes 76a. Then, the fuel gas flows through the inlet connection channel 72 on the surface 18b, and flows into the second supply holes 76b toward the fuel gas flow field 44.

Thus, in the channel unit (including the channel 80 and the inlet connection channel 72 formed by the receivers 68) connecting the fuel gas supply passage 34a and the fuel gas flow field 44, since the first and second supply holes 76a, 76b are provided, the flow field resistance (pressure loss) is increased. Therefore, the water can be discharged from the channel unit efficiently. Accordingly, it is possible to suitably supply the fuel gas to the anode 38 (power generation area), and the desired power generation performance is achieved. Further, reduction in the length of the channel unit is achieved to have simple and compact structure.

At least the first and the second discharge holes 78a, 78b are formed between the fuel gas discharge passage 34b and the outlet of the fuel gas flow field 44. Therefore, the flow field resistance in the channel unit connecting the fuel gas flow field 44 and the fuel gas discharge passage 34b is increased effectively. Accordingly, the water is discharged from the channel unit to the fuel gas discharge passage 34b efficiently.

Figure 7:
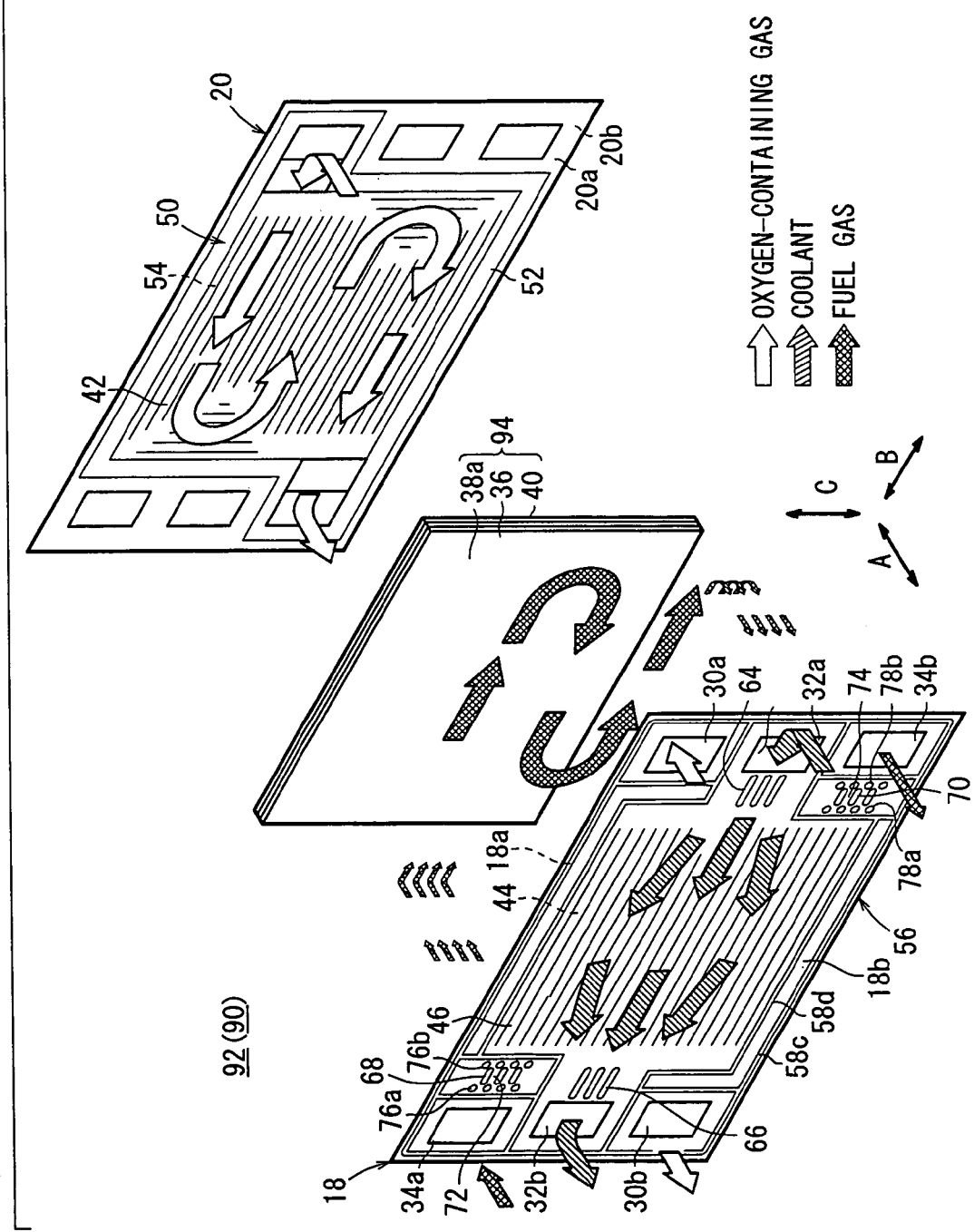
FIG. 7 is an exploded perspective view showing main components of a unit cell of a fuel cell according to a second embodiment of the present invention.
Figure 8:
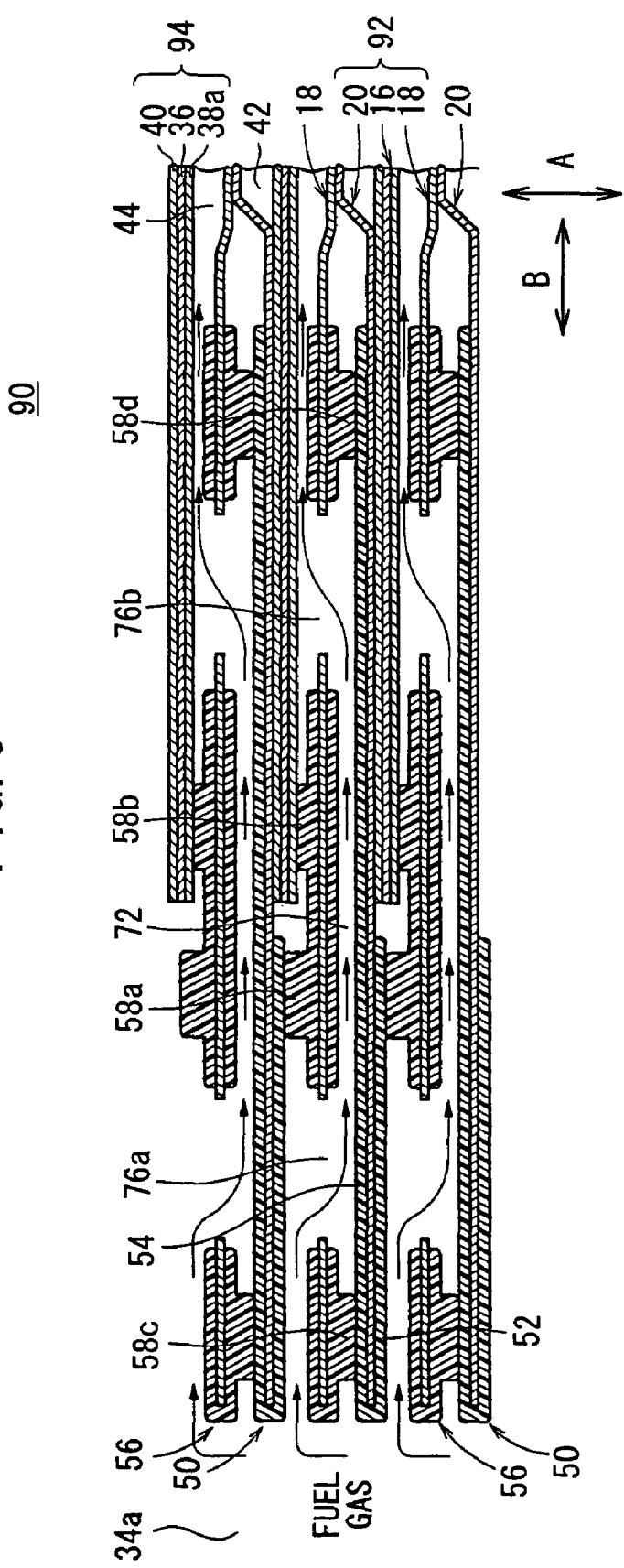
FIG. 8 is a cross sectional view showing the fuel cell.

FIG. 7 is an exploded perspective view showing main components of a unit cell 92 of a fuel cell 90 according to a second embodiment of the present invention. FIG. 8 is a cross sectional view showing the fuel cell 90. The constituent elements that are identical to those of the fuel cell 10 according to the first embodiment are labeled with the same reference numeral, and description thereof will be omitted. Likewise, in third to sixth embodiments as described later, the constituent elements that are identical to those of the fuel cell 10 according to the first embodiment are labeled with the same reference numeral, and description thereof will be omitted.

The unit cell 92 includes a membrane electrode assembly 94. The membrane electrode assembly 94 includes an anode 38a, a cathode 40, and a solid polymer electrolyte membrane 36 interposed between the anode 38a and the cathode 40. The surface area of the solid polymer electrolyte membrane 36, the surface area of the anode 38a, and the surface area of the cathode 40 are the same.

Figure 9:
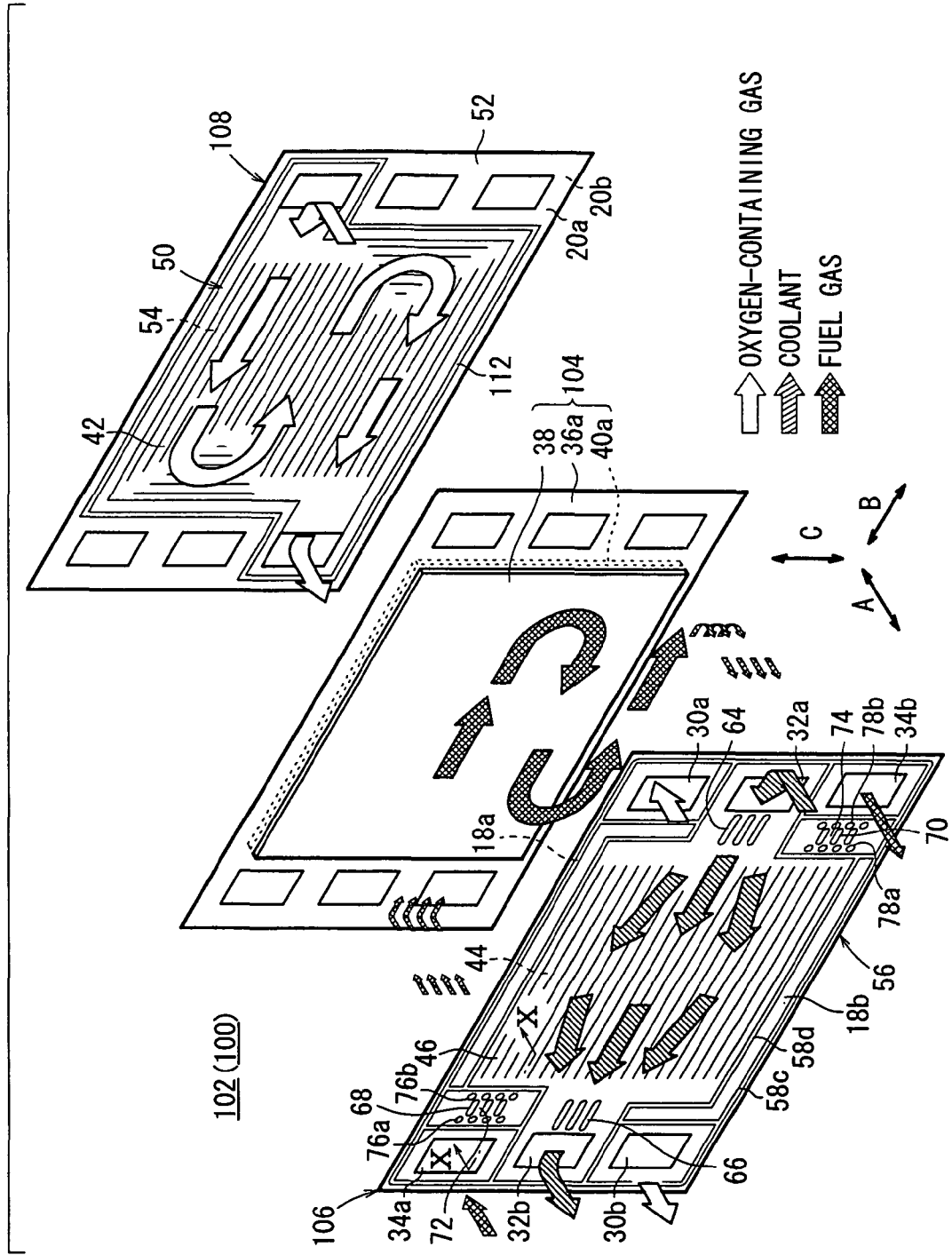
FIG. 9 is an exploded perspective view showing main components of a unit cell of a fuel cell according to a third embodiment of the present invention.
Figure 10:
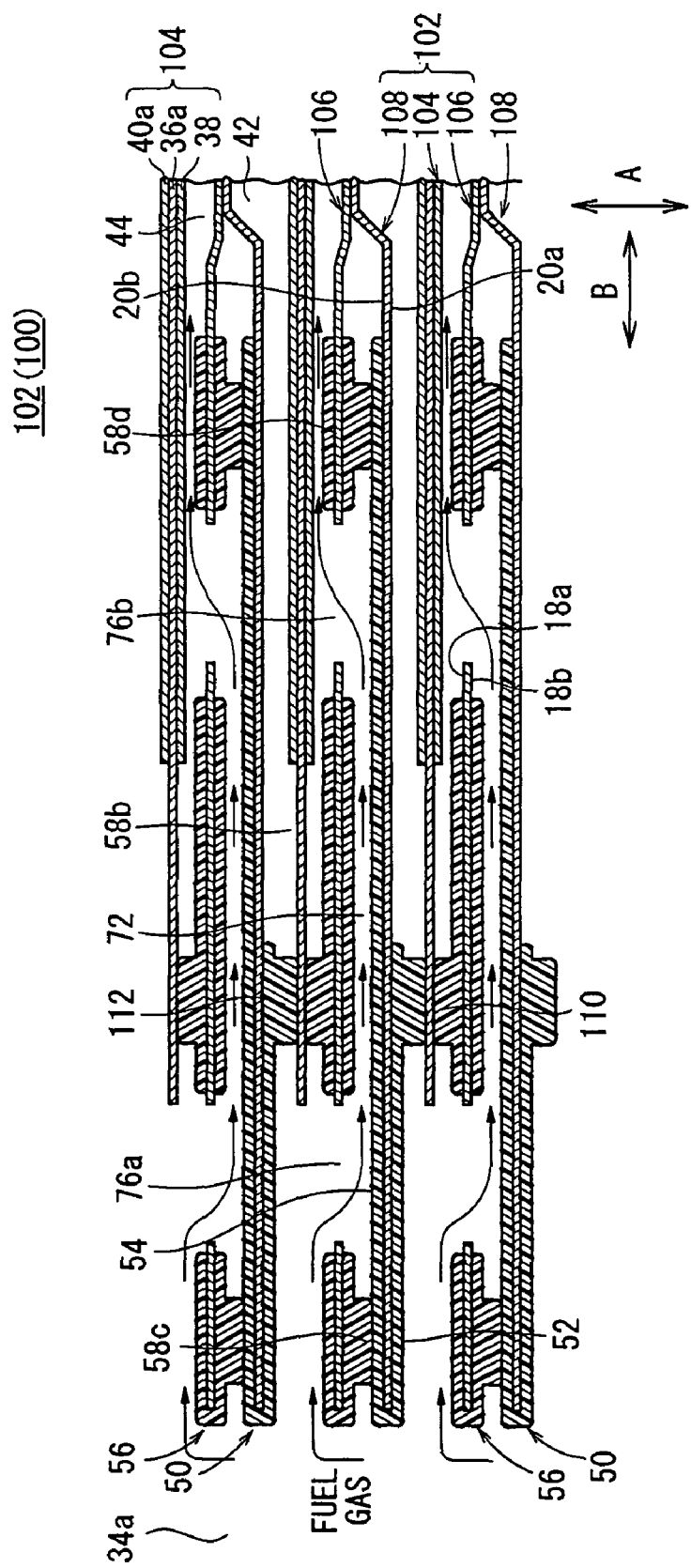
FIG. 10 is a cross sectional view showing the fuel cell, taken along a line X-X in FIG. 9.

FIG. 9 is an exploded view showing main components of a unit cell 102 of a fuel cell 100 according to a third embodiment of the present invention. FIG. 10 is a cross sectional view showing the fuel cell 100.

The unit cell 102 includes a membrane electrode assembly 104 and an anode side metal separator 106 and a cathode side metal separator 108 sandwiching the membrane electrode assembly 104. The membrane electrode assembly 104 includes an anode 38, a cathode 40a, and a solid polymer electrolyte membrane 36a interposed between the anode 38 and the cathode 40a. The surface area of the solid polymer electrolyte membrane 36a is larger than the surface area of the anode 38 and the surface area of the cathode 40a.

Figure 11:
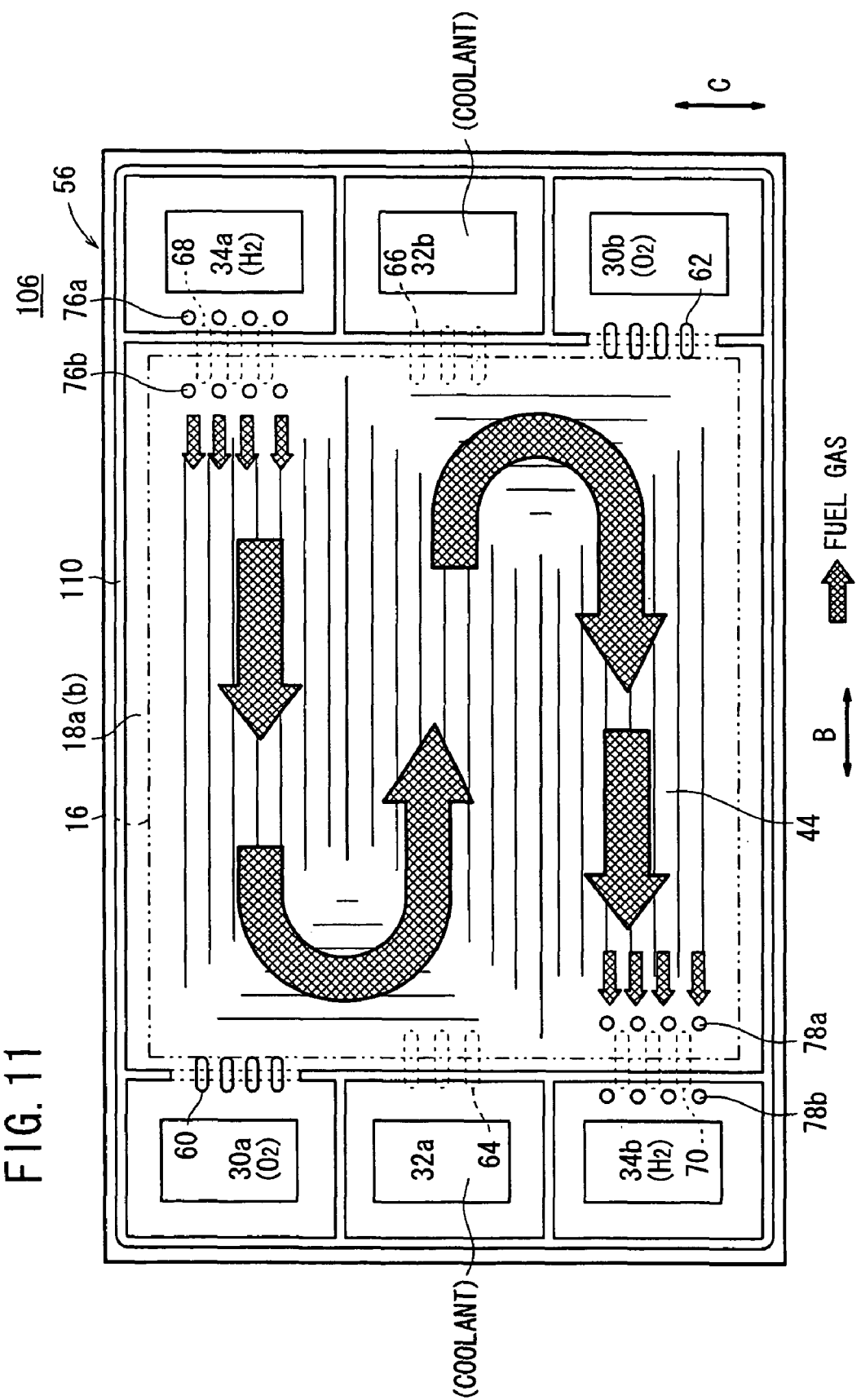
FIG. 11 is a front view showing an anode side metal separator of the fuel cell.

As shown in FIGS. 10 and 11, the anode side metal separator 106 has a seal 110 as part of the second seal member 56 on its surface 18a facing the anode 38. The seal 110 is provided in the area corresponding to the outer end of the solid polymer electrolyte membrane 36a of the membrane electrode assembly 104.

The cathode side metal separator 108 has a seal 112 as part of the first seal member 50 on its surface 20b facing the cathode 40a. The seal 112 and the seal 110 are provided oppositely to sandwich the outer end of the solid polymer electrolyte membrane 36a.

In the fuel cells 90, 100 according to the second and third embodiments, the first and second supply holes 76a, 76b are provided in the channel unit connecting the fuel gas supply passage 34a and the fuel gas flow field 44, and the first and second discharge holes 78a, 78b are provided in the channel unit connecting the fuel gas flow field 44 and the fuel gas discharge passage 34b. Therefore, the same advantages as in the case of the fuel cell 10 according to the first embodiment can be obtained.

Figure 12:
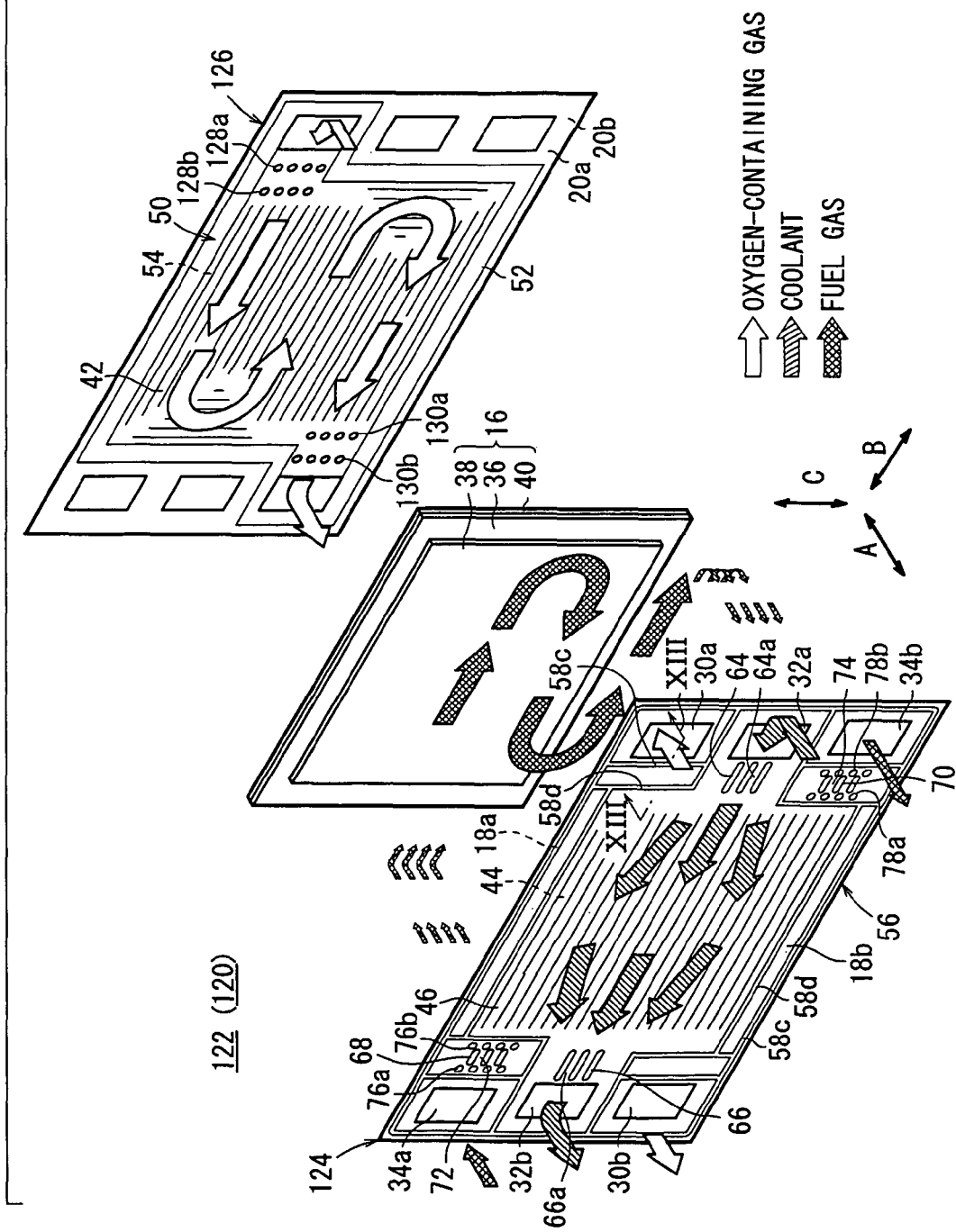
FIG. 12 is an exploded perspective view showing main components of a unit cell of a fuel cell according to a fourth embodiment of the present invention.
Figure 13:
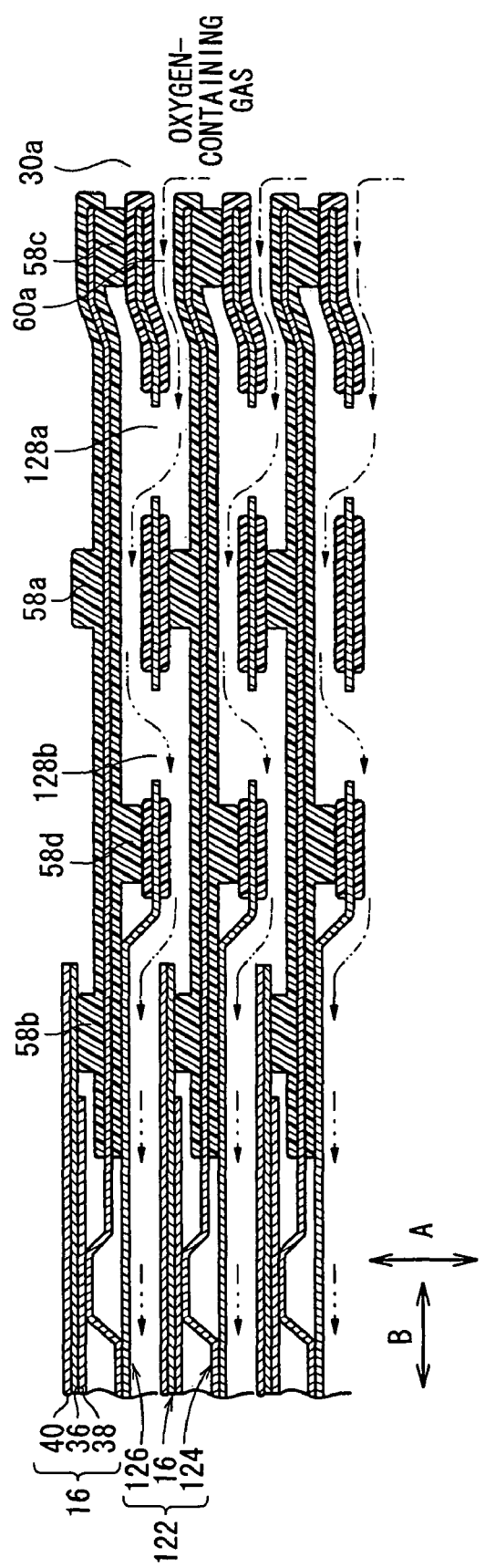
FIG. 13 is a cross sectional view showing the fuel cell, taken along a line XIII-XIII in FIG. 12.

FIG. 12 is an exploded perspective view showing a unit cell 122 of a fuel cell 120 according to a fourth embodiment of the present invention. FIG. 13 is a cross sectional view showing the unit cell 122 at the oxygen-containing gas inlet.

The unit cell 122 includes a membrane electrode assembly 16 and an anode side metal separator 124 and a cathode side metal separator 126 sandwiching the membrane electrode assembly 16. The cathode side metal separator 126 has a plurality of first supply holes (first openings) 128a near the oxygen-containing gas supply passage 30a, and a plurality of second supply holes (second openings) 128b provided at positions spaced away from the first supply holes 128a toward the oxygen-containing gas flow field 42.

At the end of the oxygen-containing gas flow field 42, a plurality of first discharge holes (second openings) 130a are formed, and a plurality of second discharge holes (first openings) 130b are formed near the oxygen-containing gas discharge passage 30b.

Figure 14:
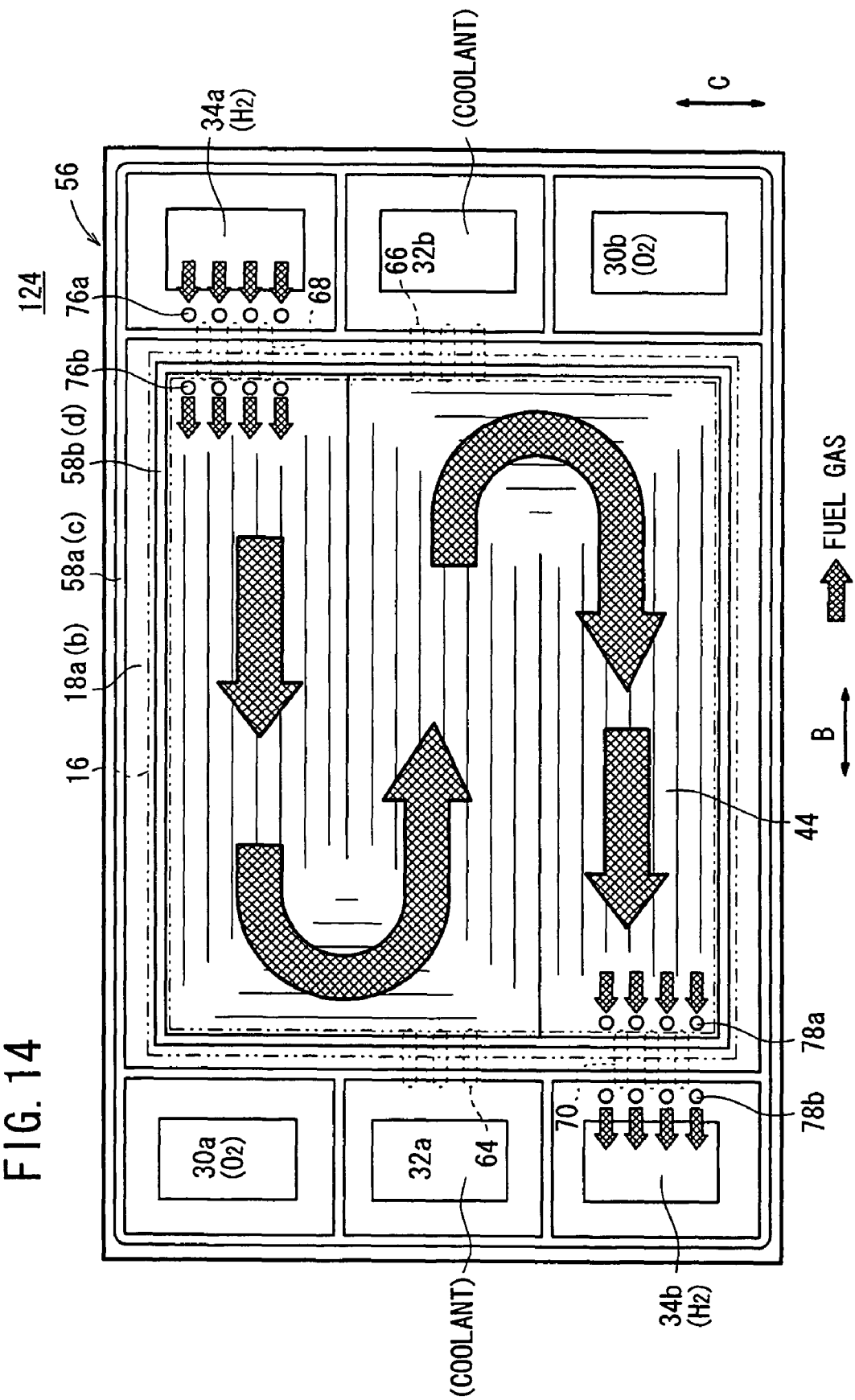
FIG. 14 is a front view showing an anode side metal separator of the fuel cell.

As shown in FIGS. 12 and 14, in the anode side metal separator 124, the second seal member 56 does not include any receivers 60, 62. The second seal member 56 is formed around the first supply holes 128a and the second discharge holes 130b.

As shown in FIG. 12, the outer seal 58c and the inner seal 58d are shaped such that the oxygen-containing gas flows along the surface 18b at the oxygen-containing gas supply passage 30a and the oxygen-containing gas discharge passage 30b.

In the fourth embodiment, as shown in FIG. 13, the oxygen-containing gas from the oxygen-containing gas supply passage 30a flows through the connection channel 60a into the first supply holes 128a of the cathode side metal separator 126. The oxygen-containing gas temporarily flows on the side of the coolant flow field 46. Then, the oxygen-containing gas flows into the second supply holes 128b. The oxygen-containing gas returns to the side of the oxygen-containing gas flow field 42, and is supplied to the oxygen-containing gas flow field 42.

The oxygen-containing gas consumed in the reaction in the oxygen-containing gas flow field 42 flows into the first discharge holes 130a to the side of the coolant flow field 46. Then, the oxygen-containing gas flows into the second discharge holes 130b, and is discharged into the oxygen-containing gas discharge passage 30b.

In the fourth embodiment, in the channel unit connecting the oxygen-containing gas supply passage 30a and the oxygen-gen-containing gas flow field 42, since the first and second supply holes 128a, 128b are provided, the pressure loss in the channel unit is increased, and the water is discharged from the channel unit efficiently. Further, no bridge plates are required for the cathode side metal separator 126.

Figure 15:
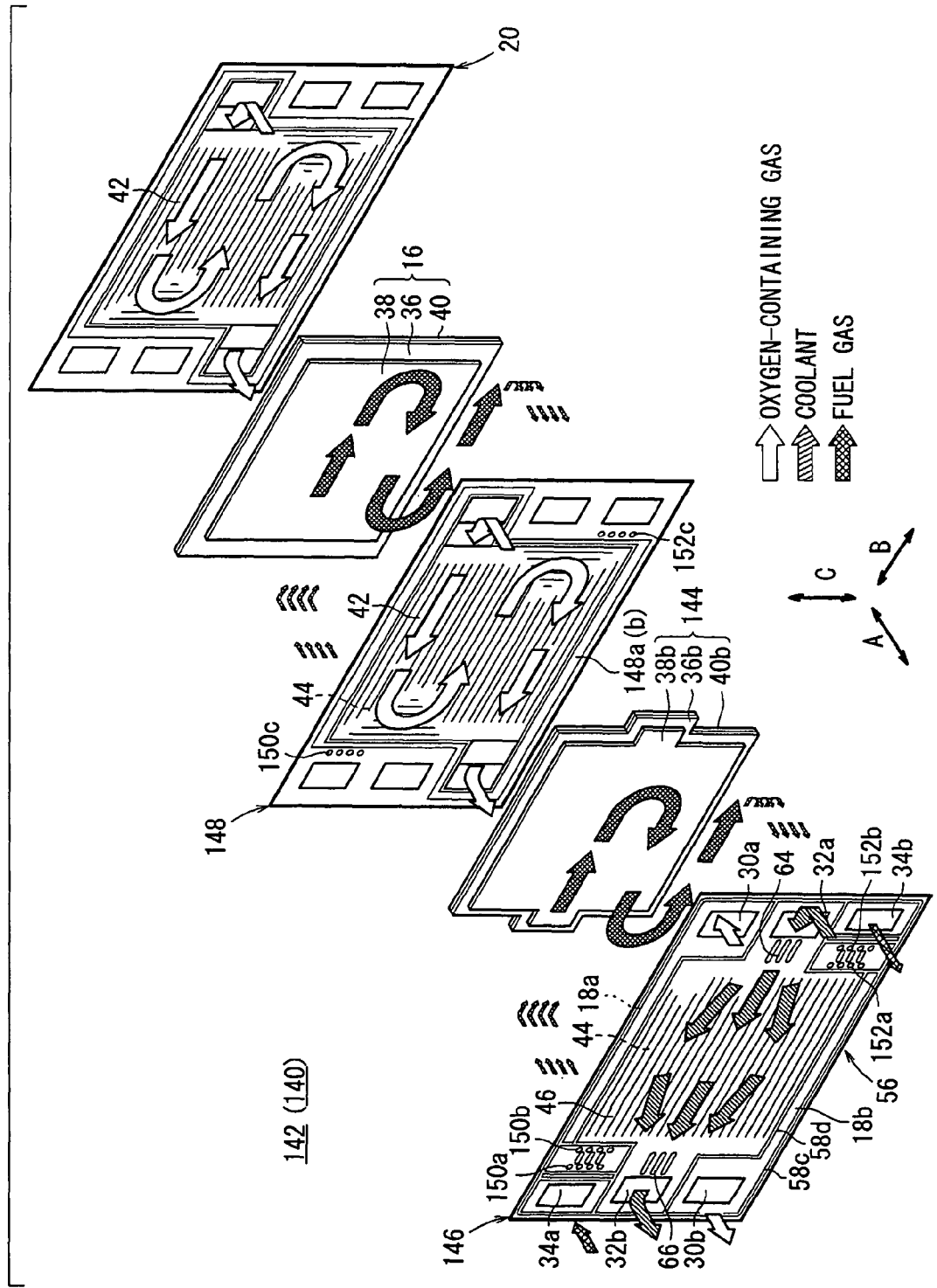
FIG. 15 is an exploded perspective view showing main components of a fuel cell according to a fifth embodiment of the present invention.
Figure 16:
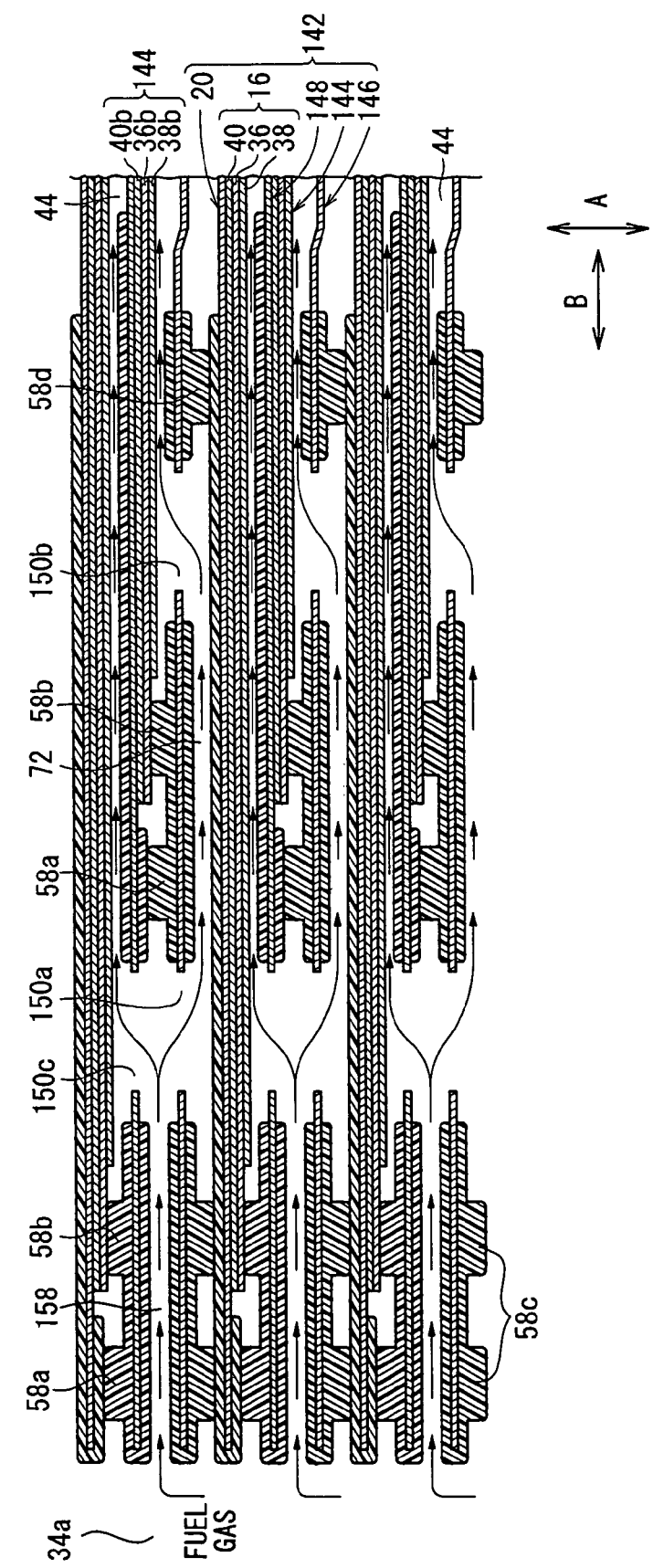
FIG. 16 is a cross sectional view showing the fuel cell.

FIG. 15 is an exploded perspective view showing main components of a fuel cell 140 according to a fifth embodiment of the present invention. FIG. 16 is a cross sectional view showing the fuel cell 140.

The fuel cell 140 is formed by stacking fuel cell units 142 in the direction indicated by the arrow A. Each of the fuel cell units 142 includes substantially two unit cells. The fuel cell unit 142 includes an anode side metal separator (first separator) 146, a first membrane electrode assembly 144, an intermediate meal separator (second separator) 148, a second membrane electrode assembly 16, and a cathode side metal separator 20.

The first membrane electrode assembly 144 includes an anode 38b, a cathode 40b, and a solid polymer electrolyte membrane 36b interposed between the anode 38b and the cathode 40b. The surface area of the anode 38b is smaller than the surface area of the cathode 40b. The opposite ends of the solid polymer electrolyte membrane 36b, the anode 38b, and the cathode 40b are cut away at upper and lower positions to reduce the surface area.

In the anode side metal separator 146, a plurality of first supply holes 150a and a plurality of second supply holes 150b are formed between the fuel gas supply passage 34a and the fuel gas flow field 44. Likewise, a plurality of first discharge holes 152a and a plurality of second discharge holes 152b are formed between the fuel gas flow field 44 and the fuel gas discharge passage 34b.

The first and second supply holes 150a, 150b are spaced away from the fuel gas supply passage 34a toward the fuel gas flow field 44 in comparison with the first and second supply holes 76a, 76b of the anode side metal separator 18 used in the first embodiment. Likewise, the first and second discharge holes 152a, 152b are spaced away from the fuel gas discharge passage 34b toward the fuel gas flow field 44 in comparison with the first and second discharge holes 78a, 78b used in the first embodiment.

Figure 17:
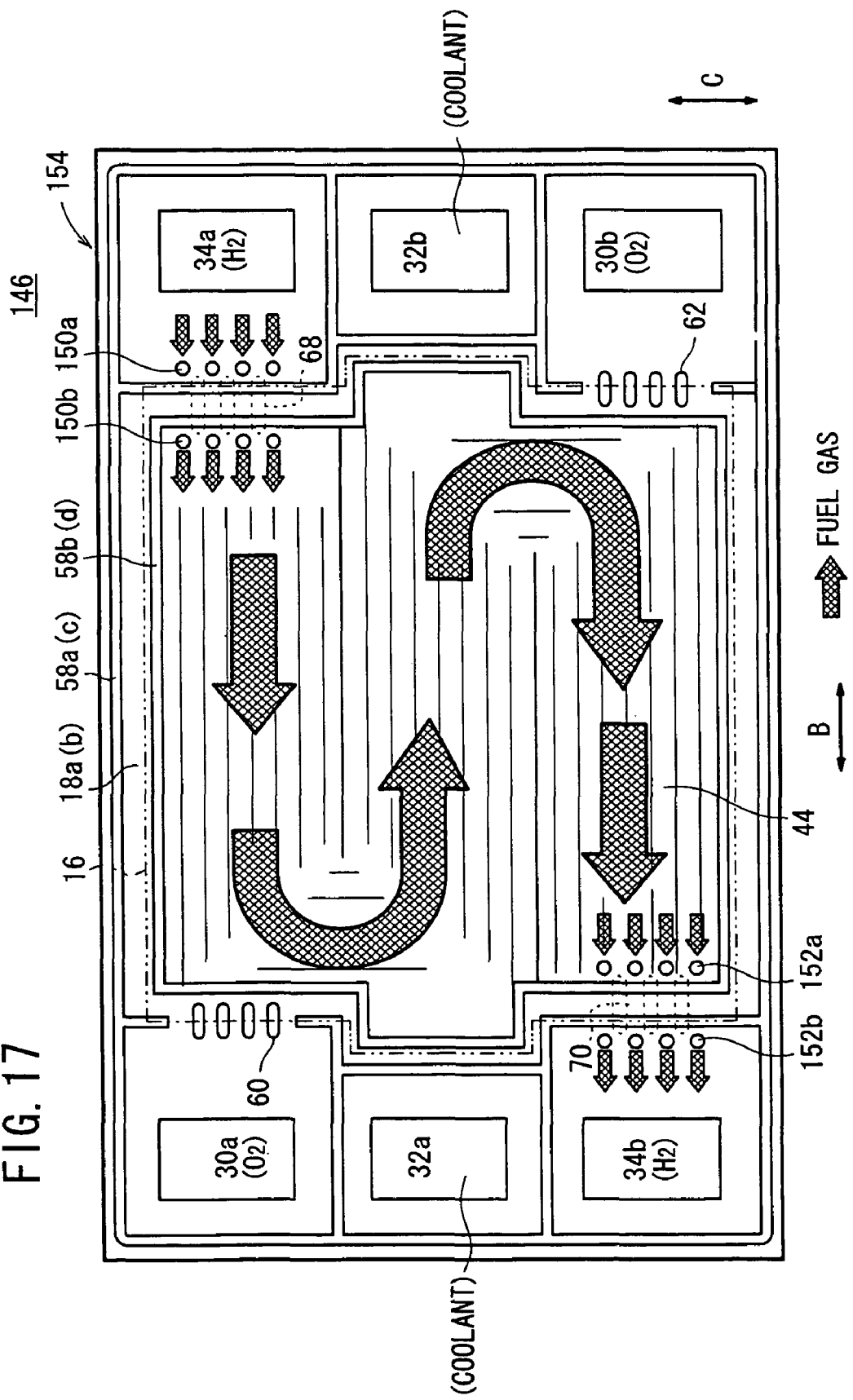
FIG. 17 is a front view showing an anode side metal separator of the fuel cell.

As shown in FIG. 17, the outer seal 58a and the inner seal 58b of the second seal member 154 are provided on the surface 18a of the anode side metal separator 146 facing the anode 38b. The shapes of the outer seal 58a and the inner seal 58b correspond to the shape of the first membrane electrode assembly 144.

As shown in FIG. 15, the outer seal 58c and the inner seal 58d provided on the surface 18b of the anode side metal separator 146 have predetermined shapes corresponding to positions or the like of the first and second supply holes 150a, 150b and the first and second discharge holes 152a, 152b.

The intermediate metal separator 148 has supply holes 150c near the fuel gas supply passage 34a. The supply holes 150c are in alignment with the first supply holes 150a in the direction indicated by the arrow A. Further, the intermediate metal separator 148 has discharge holes 152c near the fuel gas discharge passage 34b. The discharge holes 152c are in alignment with the second discharge holes 152b in the direction indicated by the arrow A. The intermediate metal separator 148 has the oxygen-containing gas flow field 42 on its surface 148a facing the first membrane electrode assembly 16, and has the fuel gas flow field 44 on its surface 148a facing the second membrane electrode assembly 16 (see FIGS. 15, 18, and 19).

Figure 18:
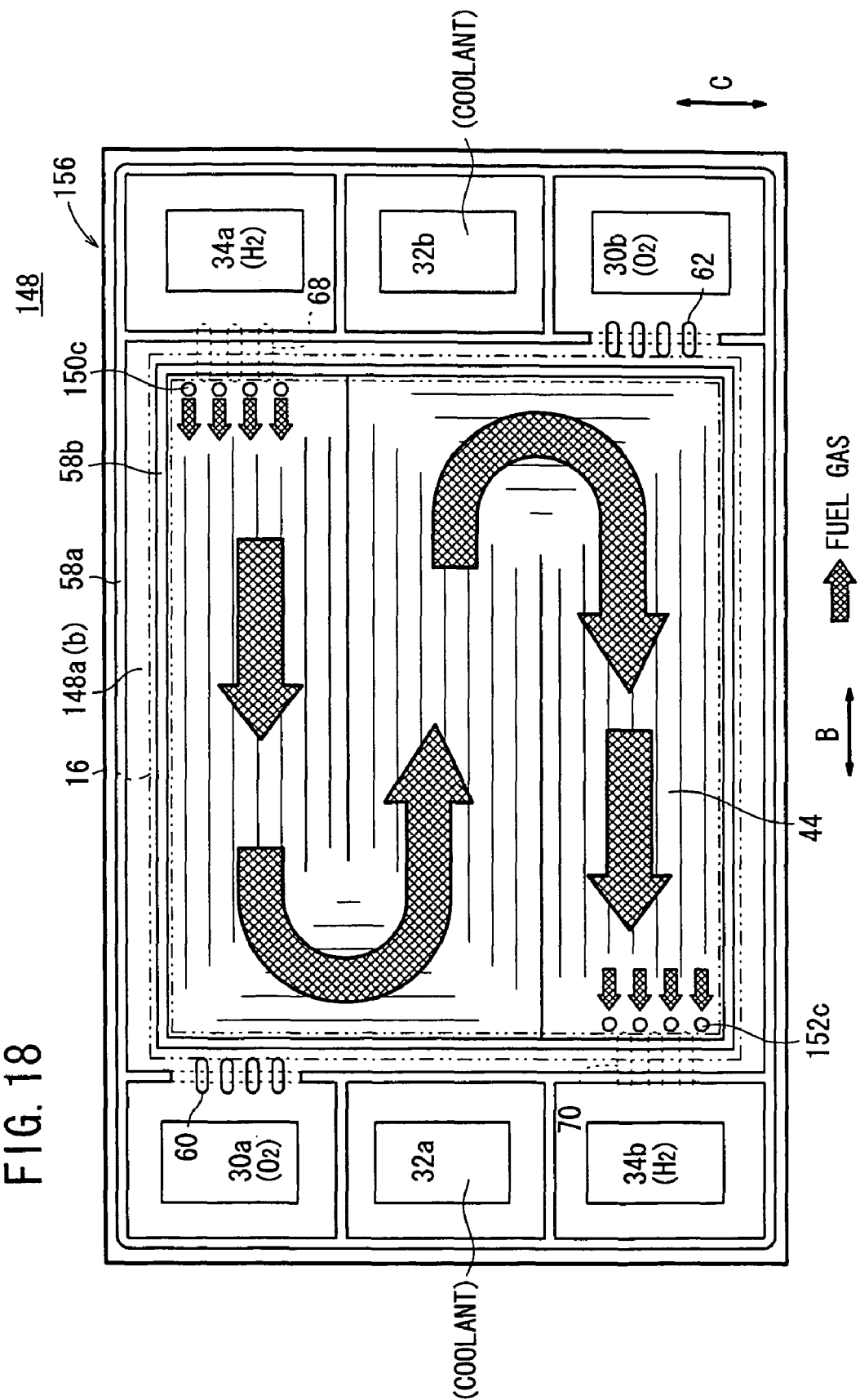
FIG. 18 is a front view showing an intermediate metal separator of the fuel cell.
Figure 19:
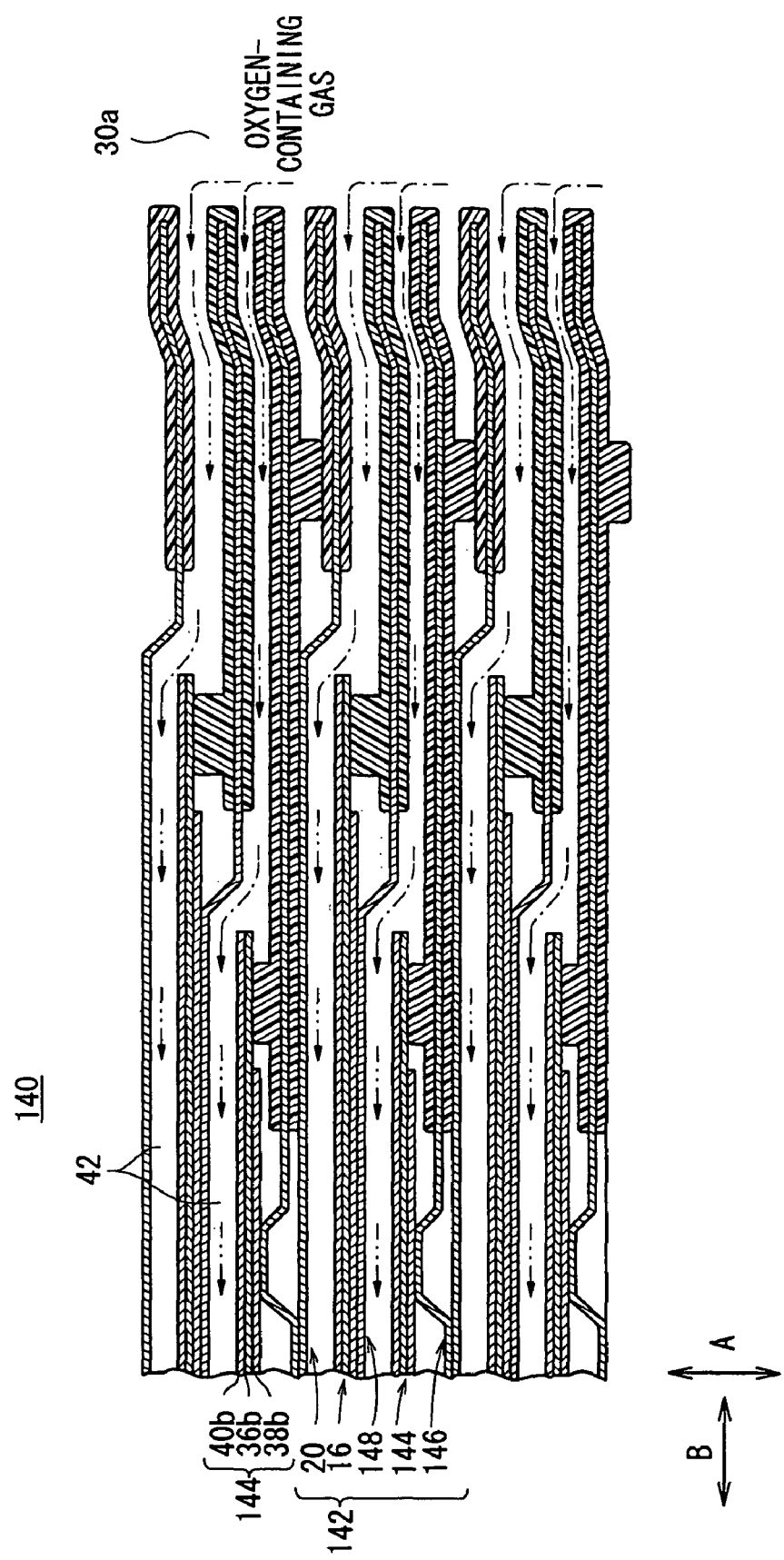
FIG. 19 is a cross sectional view showing the fuel cell at a position near an oxygen-containing gas supply passage.

As shown in FIG. 18, the intermediate metal separator 148 has a seal member 156 including an outer seal 58a and an inner seal 58b on the surface 148b. As shown in FIG. 16, a common channel 158 connected to the fuel gas supply passage 34a is formed between the anode side metal separator 146 and the intermediate metal separator 148. The common channel 158 is connected to the inlet connection channel 72 through the first supply holes 150a, and connected to the fuel gas flow field 44 of the intermediate metal separator 148 through the supply holes 150c.

In the fifth embodiment, as shown in FIG. 16, the fuel gas flowing through the fuel gas supply passage 34a is supplied into the common channel 158 formed between the anode side metal separator 146 and the intermediate metal separator 148, and flows separately into the first supply holes 150a and the supply holes 150c.

The fuel gas which has passed the first supply holes 150a flows from the inlet connection channel 72 to the anode 38b of the first membrane electrode assembly 144 through the second supply holes 150b. The fuel gas which has passed the supply holes 150c flows through the fuel gas flow field 44 of the intermediate metal separator 148 along the anode 38 of the second membrane electrode assembly 16.

Thus, in the fifth embodiment, since the first and second supply holes 150a, 150b are provided in the channel unit connecting the fuel gas supply passage 34a to fuel gas flow field 44, the same advantages as in the cases of the first to fourth embodiments can be obtained. For example, the pressure loss in the channel unit is increased, and the water can be discharged efficiently.

Further, the fuel cell unit 142 is chiefly made up of the first unit cell including the first membrane electrode assembly 144 and the second unit cell including the second membrane electrode assembly 16. A plurality of the fuel cell unit 142 are stacked together in the direction indicated by the arrow A. That is, the coolant flow field 46 is provided for every two or more unit cells.

The common channel 158 connected to the fuel gas supply passage 34a is formed between the anode side metal separator 146 and the intermediate metal separator 148 as the first and second separators. The fuel gas flows from the common channel 158 separately into the first supply holes 150a and the supply holes 150c, and then, the fuel gas is supplied to the first and second membrane electrode assemblies 144, 16, respectively. Thus, the number of flow grooves is reduced, and the flow field structure is simplified effectively.

In the fifth embodiment, as in the case of the fuel gas side, two openings (like the fuel cell 120 according to the fourth embodiment) can be provided between oxygen-containing gas supply passage 30a and the oxygen-containing gas flow field 42, and between the oxygen-containing gas discharge passage 30b and the oxygen-containing gas flow field 42. Further, the first and second membrane electrode assemblies 144, 16 may have the structure in which the surface area of the solid polymer electrolyte membrane, the surface area of the anode, and the surface area of the cathode are the same or the structure in which the surface area of the solid polymer electrolyte membrane is larger than the surface area of the anode and the surface area of the cathode instead of the structure in which the surface area of the anode is smaller than the surface area of the cathode.

Figure 20:
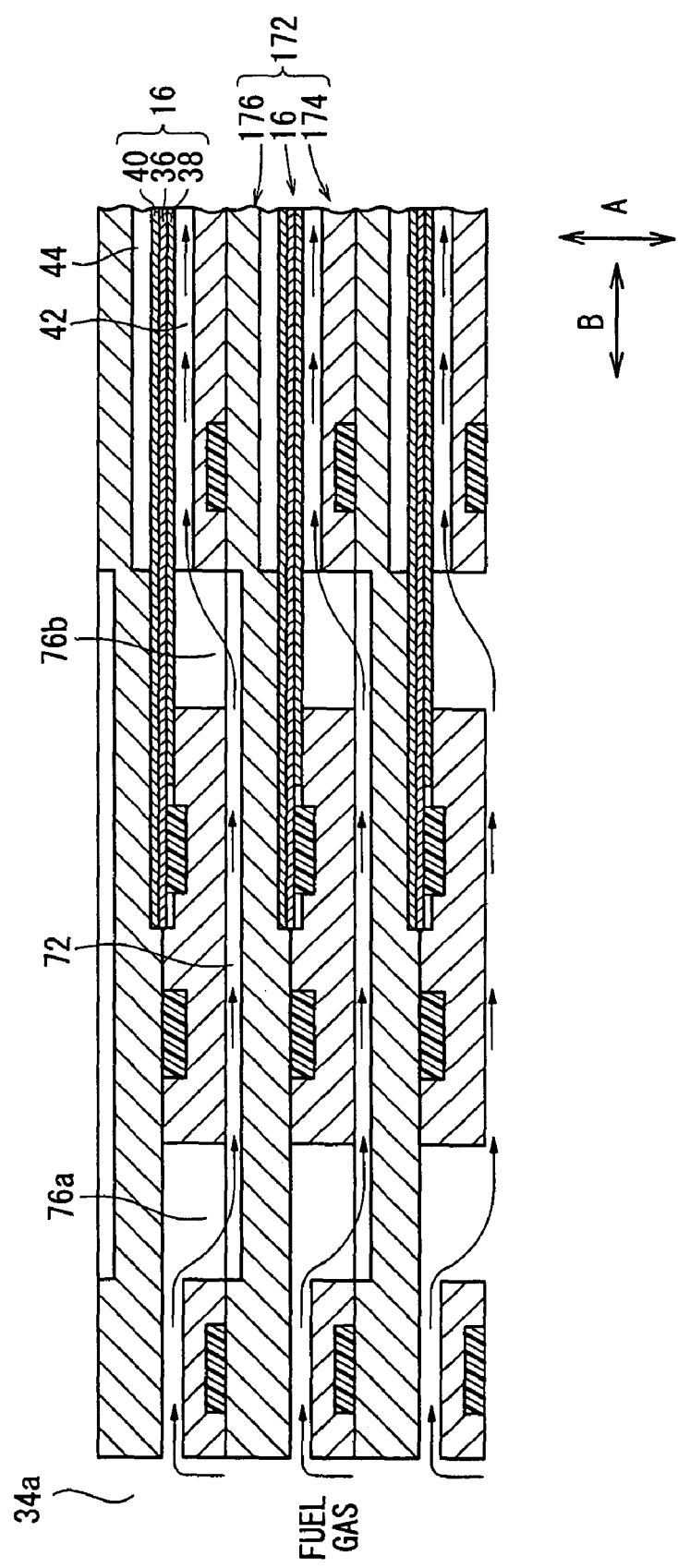
FIG. 20 is a cross sectional view showing a fuel cell according to a sixth embodiment of the present invention.
Figure 21:
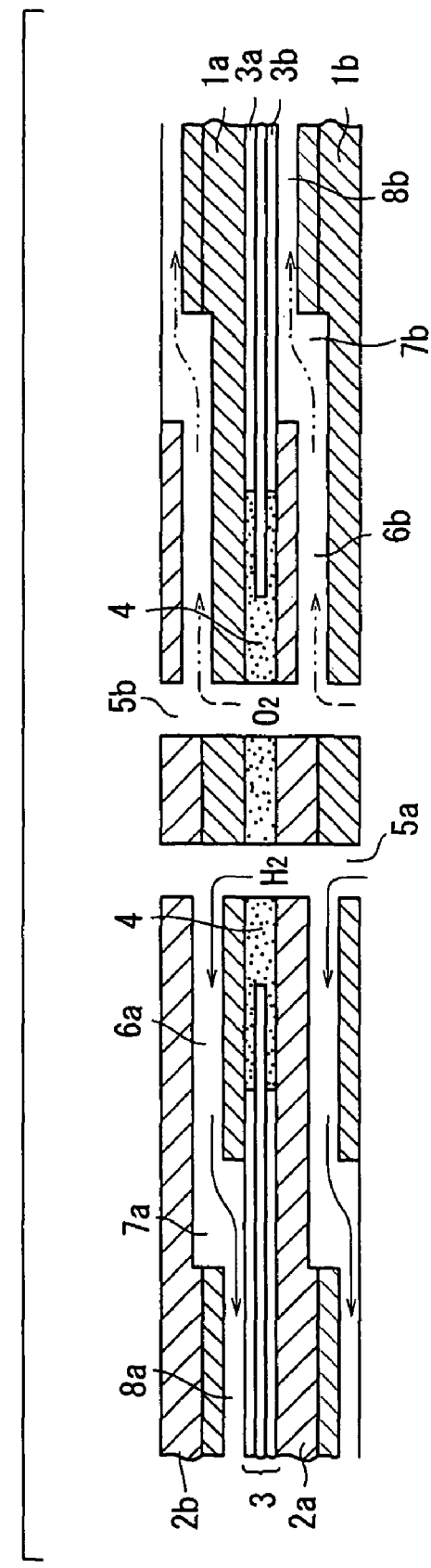
FIG. 21 is a cross sectional view showing a conventional electrochemical fuel cell stack.

Further, though metal separators are used in the first to fifth embodiments, the present invention is not limited in this respect. For example, carbon separators may be used. As an example, FIG. 20 shows a cross sectional view showing a fuel cell 170 according to a sixth embodiment.

The fuel cell 170 has the structure like the fuel cell 10 according to the first embodiment. However, the present invention is not limited in this respect. The fuel cell 170 having the carbon separators may be applicable to the second to fifth embodiment. The fuel cell 170 is formed by stacking unit cells 172 in the direction indicated by the arrow A. The unit cell 172 includes a second membrane electrode assembly 16 and an anode side carbon separator 174 and a cathode side carbon separator 176 sandwiching the second membrane electrode assembly 16. It should be appreciated that, e.g., gaskets may be used as the seal members in the fuel cell 170.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a unit cell, said unit cell including an electrolyte electrode assembly and separators sandwiching said electrolyte electrode assembly, said electrolyte electrode assembly including electrodes, and an electrolyte interposed between said electrodes, a reactant gas passage extending through said separators for allowing at least one of a fuel gas and an oxygen-containing gas as a reactant gas to flow through said reactant gas passage, a reactant gas flow field being formed in one of said separators for allowing the reactant gas to flow along one electrode surface of said electrolyte electrode assembly, wherein the one of said separators has a channel unit connecting said reactant gas passage and said reactant gas flow field; and said channel unit includes a first opening extending through the one of said separators at a position near said reactant gas passage for allowing the reactant gas to flow through said first opening, and a second opening extending through the one of said separators at a position near said reactant gas flow field for allowing the reactant gas to flow through said second opening, wherein a channel connecting said reactant gas passage and said first opening from one electrode surface of said electrolyte electrode assembly, and a connection channel connecting said first opening and said second opening on a surface opposite to the one electrode surface are provided.

2. A fuel cell according to claim 1, wherein a coolant flow field extending along a separator surface is formed for each unit cell or for every two or more unit cells.

3. A fuel cell according to claim 1, wherein said connection channel is formed by a seal member.

4. A fuel cell according to claim 1, wherein a seal member for blocking an area between said first opening and said second opening is provided on the one electrode surface.

5. A fuel cell according to claim 1, wherein said channel is formed by a seal member.

6. A fuel cell according to claim 1, wherein said electrolyte electrode assembly comprises a first electrode, a second electrode and an electrolyte membrane interposed between said first and second electrodes, and a surface area of said second electrode is larger than a surface area of said first electrode.

7. A fuel cell according to claim 1, wherein said electrolyte electrode assembly comprises a pair of electrodes, and an electrolyte membrane interposed between the pair of electrodes, and a surface area of one of the pair of electrodes, a surface area of the other of the pair of electrodes, and a surface area of said electrolyte membrane are the same.

8. A fuel cell according to claim 1, wherein said electrolyte electrode assembly comprises a pair of electrodes, and an electrolyte membrane interposed between the pair of electrodes, and a surface area of said electrolyte membrane is large in comparison with that of each of the electrodes.

9. A fuel cell formed by stacking a plurality of unit cells in a stacking direction, separators sandwiching an electrolyte electrode assembly in each of said unit cells, said electrolyte electrode assembly including electrodes, and an electrolyte interposed between said electrodes, a reactant gas passage extending through said separators for allowing at least one of a fuel gas and an oxygen-containing gas as a reactant gas to flow through said reactant gas passage, a reactant gas flow field being formed in one of said separators for allowing the reactant gas to flow along one electrode surface of said electrolyte electrode assembly, wherein a coolant flow field extending along a separator surface is formed for every two or more unit cells;

a common channel connected to said reactant gas passage is formed between adjacent first and second separators;

said first separator has a first reactant gas flow field for allowing the reactant gas to flow along the one electrode surface of said electrolyte electrode assembly;

a first opening extends through said first separator, said first opening being connected to said common channel for allowing the reactant gas to flow though said first opening;

a second opening extends through said first separator at a position near said first reactant gas flow field for allowing the reactant gas to flow through said second opening;

said second separator has a second reactant gas flow field for allowing the reactant gas to flow the one electrode surface of another electrolyte electrode assembly; and an opening extends through said second separator for connecting said common channel and said second reactant gas flow field.

10. A fuel cell according to claim 9, wherein said first opening of said first separator and said opening of said second separator are in alignment with each other in the stacking direction.

11. A fuel cell according to claim 9, wherein said common channel is formed by a seal member.

12. A fuel cell according to claim 9, wherein a connection channel connecting said first opening and said second opening on a surface opposite to the one electrode surface of said electrolyte electrode assembly is provided.

13. A fuel cell according to claim 12, wherein a seal member for blocking an area between said first opening and said second opening is provided on the one electrode surface.

14. A fuel cell according to claim 9, wherein said electrolyte electrode assembly comprises a first electrode, a second electrode and an electrolyte membrane interposed between said first and second electrodes, and a surface area of said second electrode is larger than a surface area of said first electrode.

15. A fuel cell according to claim 9, wherein said electrolyte electrode assembly comprises a pair of electrodes, and an electrolyte membrane interposed between the pair of electrodes, and a surface area of one of the pair of electrodes, a surface area of the other of the pair of electrodes, and a surface area of said electrolyte membrane are the same.

16. A fuel cell according to claim 9, wherein said electrolyte electrode assembly comprises a pair of electrodes, and an electrolyte membrane interposed between the pair of electrodes, and a surface area of said electrolyte membrane is large in comparison with that of each of the electrodes.

17. A separator for a fuel cell, said separator being provided adjacent to an electrolyte electrode assembly including electrodes, and an electrolyte interposed between said electrodes, a reactant gas passage extending through said separator for allowing at least one of a fuel gas and an oxygen-containing gas as a reactant gas to flow through said reactant gas passage, a reactant gas flow field being formed in said separator for allowing the reactant gas to flow along one electrode surface of said electrolyte electrode assembly, wherein said separator has a channel unit connecting said reactant gas passage and said reactant gas flow field; and said channel unit including a first opening extending through said separator at a position near said reactant gas passage for allowing the reactant gas to flow through said first opening, and a second opening extending through said separator at a position near said reactant gas flow field for allowing the reactant gas to flow through said second opening, wherein a channel connecting said reactant gas passage and said first opening from one electrode surface of said electrolyte electrode assembly, and a connection channel connecting said first opening and said second opening on a surface opposite to the one electrode surface are provided.

18. A separator according to claim 17, wherein a fuel gas flow field is formed as said reactant gas flow field on one surface of said separator for allowing a fuel gas as the reactant gas to flow along the one electrode surface of said electrolyte electrode assembly; and an oxygen-containing gas flow field is formed on the other surface of said separator for allowing an oxygen-containing gas as the other reactant gas along the other electrode surface of said electrolyte electrode assembly.

* * * * *